US012745814B2

(12) United States Patent
Schultz et al.

(10) Patent No.: US 12,745,814 B2
(45) **Date of Patent: *Sep. 29, 2026**

(54) RENDERING A 3D GARMENT PREVIEW

(71) Applicant: Levi Strauss & Co., San Francisco, CA (US)

(72) Inventors: Christopher Schultz, Beaverton, OR (US); Debdulal Mahanty, Fremont, CA (US); James Barton Sights, San Francisco, CA (US); Benjamin Bell, San Francisco, CA (US); Jennifer Schultz, Beaverton, OR (US)

(73) Assignee: Levi Strauss & Co., San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/774,839

(22) Filed: Jul. 16, 2024

(65) Prior Publication Data

US 2024/0365902 A1 Nov. 7, 2024

Related U.S. Application Data

(63) Continuation of application No. 18/187,621, filed on Mar. 21, 2023, now Pat. No. 12,035,774, which is a (Continued)

(51) Int. Cl.

*G06T 19/20* (2011.01)
*A41H 3/00* (2006.01)

(Continued)

(52) U.S. Cl.

CPC ......... *A41H 3/007* (2013.01); *G06F 3/04815* (2013.01); *G06F 3/0482* (2013.01);

(Continued)

(58) Field of Classification Search

None

See application file for complete search history.

(56) References Cited

U.S. PATENT DOCUMENTS

| | | |
|---|---|---|
| 3,883,298 A | 5/1975 | Platt |
| 3,983,132 A | 9/1976 | Strobel |

(Continued)

FOREIGN PATENT DOCUMENTS

| | | |
|---|---|---|
| CA | 2066978 A1 | 6/1993 |
| CN | 101187640 A | 5/2008 |

(Continued)

OTHER PUBLICATIONS

International Search Report, PCT Application PCT/US2019/064076, Mar. 3, 2020, 8 pages.

(Continued)

*Primary Examiner* — Nicholas R Wilson

(74) *Attorney, Agent, or Firm* — Aka Chan LLP

(57) ABSTRACT

A tool allows a user to create new designs for apparel and preview these designs in three dimensions before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

20 Claims, 36 Drawing Sheets

Related U.S. Application Data continuation of application No. 16/701,113, filed on Dec. 2, 2019, now Pat. No. 11,612,203.

(60) Provisional application No. 62/774,127, filed on Nov. 30, 2018.

(51) Int. Cl.

| | |
|---|---|
| ***G06F 3/04815*** | (2022.01) |
| ***G06F 3/0482*** | (2013.01) |
| ***G06F 3/04845*** | (2022.01) |
| ***G06F 30/10*** | (2020.01) |
| ***G06F 30/12*** | (2020.01) |
| ***G06F 30/20*** | (2020.01) |
| ***G06T 15/60*** | (2006.01) |
| ***G06T 17/10*** | (2006.01) |
| *A41D 1/06* | (2006.01) |
| *D06B 11/00* | (2006.01) |
| *D06C 23/02* | (2006.01) |
| *D06M 10/00* | (2006.01) |
| *G06F 111/16* | (2020.01) |
| *G06F 113/12* | (2020.01) |
| *G06T 11/10* | (2026.01) |

(52) U.S. Cl.

CPC .......... *G06F 3/04845* (2013.01); *G06F 30/10* (2020.01); *G06F 30/12* (2020.01); *G06F 30/20* (2020.01); *G06T 15/60* (2013.01); *G06T 17/10* (2013.01); *G06T 19/20* (2013.01); *A41D 1/06* (2013.01); *D06B 11/0096* (2013.01); *D06C 23/02* (2013.01); *D06M 10/005* (2013.01); *D10B 2501/04* (2013.01); *G06F 2111/16* (2020.01); *G06F 2113/12* (2020.01); *G06T 11/10* (2026.01); *G06T 2210/16* (2013.01); *G06T 2219/2004* (2013.01); *G06T 2219/2016* (2013.01)

(56) References Cited

U.S. PATENT DOCUMENTS 4,527,383 A 7/1985 Bingham
5,015,849 A 5/1991 Gilpatrick
5,185,511 A 2/1993 Yabu
5,201,027 A 4/1993 Casini
5,367,141 A 11/1994 Piltch
5,537,939 A 7/1996 Horton
5,567,207 A 10/1996 Lockman et al.
5,573,851 A 11/1996 Lengers et al.
5,605,641 A 2/1997 Chiba et al.
5,839,380 A 11/1998 Muto
5,880,430 A 3/1999 Wein
5,916,461 A 6/1999 Costin et al.
5,990,444 A 11/1999 Costin
6,002,099 A 12/1999 Martin et al.
6,004,018 A 12/1999 Kawasato et al.
6,086,966 A 7/2000 Gundjian et al.
6,140,602 A 10/2000 Costin
6,192,292 B1 2/2001 Taguchi
6,252,196 B1 6/2001 Costin et al.
6,315,202 B2 11/2001 Costin et al.
6,356,648 B1 3/2002 Taguchi
6,407,361 B1 6/2002 Williams
6,465,046 B1 10/2002 Hansson et al.
6,495,237 B1 12/2002 Costin
6,548,428 B1 4/2003 Lanitz et al.
6,576,862 B1 6/2003 Costin et al.
6,616,710 B1 9/2003 Costin et al.
6,664,505 B2 12/2003 Martin
6,685,868 B2 2/2004 Costin
6,689,517 B1 2/2004 Kaminsky et al.
6,706,785 B1 3/2004 Fu
6,726,317 B2 4/2004 Codos
6,753,501 B1 6/2004 Costin, Sr. et al.
6,765,608 B1 7/2004 Himeda et al.
6,807,456 B1 10/2004 Costin, Jr. et al.
6,819,972 B1 11/2004 Martin et al.
6,832,125 B2 12/2004 Sonnenberg et al.
6,836,694 B1 12/2004 Podubrin
6,836,695 B1 12/2004 Goldman
6,858,815 B1 2/2005 Costin
6,956,596 B2 10/2005 Kataoka et al.
6,962,609 B2 11/2005 Rogers et al.
6,974,366 B1 12/2005 Johnson
7,005,603 B2 2/2006 Addington et al.
7,054,043 B2 5/2006 Mengel et al.
7,057,756 B2 6/2006 Ogasahara et al.
7,072,733 B2 7/2006 Magee et al.
7,100,341 B2 9/2006 McIlvaine
7,240,408 B2 7/2007 Latos et al.
7,260,445 B2 8/2007 Weiser et al.
7,324,867 B2 1/2008 Dinauer et al.
7,699,896 B1 4/2010 Colwell
7,708,483 B2 5/2010 Samii et al.
7,728,931 B2 6/2010 Hoffmuller
7,863,584 B2 1/2011 Tardif et al.
7,916,346 B2 3/2011 Matsuzaki et al.
7,937,173 B2 5/2011 Weill et al.
8,048,608 B2 11/2011 Jarvis et al.
8,278,244 B2 10/2012 Stubbs et al.
8,296,648 B2 10/2012 Tirrella
8,360,323 B2 1/2013 Widzinski, Jr. et al.
8,405,885 B2 3/2013 Shah et al.
8,453,253 B2 5/2013 Strong et al.
8,460,566 B2 6/2013 Costin, Jr.
8,529,775 B2 9/2013 Costin et al.
8,556,319 B2 10/2013 Petouhoff et al.
8,581,142 B2 11/2013 Colico et al.
8,585,956 B1 11/2013 Pagryzinski et al.
8,734,679 B2 5/2014 Marguerettaz et al.
8,794,724 B2 8/2014 Costin, Sr. et al.
8,849,444 B2 9/2014 George
8,883,293 B2 11/2014 Weedlun et al.
8,921,732 B2 12/2014 Costin et al.
8,974,016 B2 3/2015 Costin, Sr. et al.
9,034,089 B2 5/2015 Jarvis et al.
9,050,686 B2 6/2015 Costin, Sr. et al.
9,126,423 B2 9/2015 Costin, Sr. et al.
9,213,929 B2 12/2015 Tazaki et al.
9,213,991 B2 12/2015 Bhardwaj et al.
9,333,787 B2 5/2016 Cape et al.
9,364,920 B2 6/2016 Costin et al.
10,051,905 B2 8/2018 Benefiel et al.
2002/0137417 A1 9/2002 Tebbe
2002/0179580 A1 12/2002 Costin
2003/0012454 A1 1/2003 Manico et al.
2003/0089782 A1 5/2003 Reed
2004/0067706 A1 4/2004 Woods
2005/0131571 A1 6/2005 Costin
2006/0014099 A1 1/2006 Faler et al.
2006/0090868 A1 5/2006 Brownfield et al.
2007/0161304 A1 7/2007 Wangbunyen
2007/0205541 A1 9/2007 Allen et al.
2007/0227332 A1 10/2007 Causse et al.
2008/0023169 A1 1/2008 Fernandes et al.
2008/0138543 A1 6/2008 Hoshino et al.
2008/0153374 A1 6/2008 Thiriot
2008/0280107 A1 11/2008 Katschorek et al.
2009/0112353 A1 4/2009 Kirefu et al.
2009/0162621 A1 6/2009 Craamer et al.
2009/0266804 A1 10/2009 Costin et al.
2010/0119282 A1 5/2010 Olsen et al.
2010/0183822 A1 7/2010 Ruggie et al.
2010/0217427 A1 8/2010 Gray et al.
2010/0217719 A1 8/2010 Olsen et al.
2010/0279079 A1 11/2010 Campbell et al.
2010/0305909 A1 12/2010 Wolper et al.
2011/0101088 A1 5/2011 Marguerettaz et al.
2011/0187025 A1 8/2011 Costin, Sr.
2011/0261141 A1 10/2011 Costin, Sr. et al.
2011/0295410 A1 12/2011 Yamada et al.

(56) References Cited

U.S. PATENT DOCUMENTS

| | | | |
|---|---|---|---|
| 2012/0061470 | A1 | 3/2012 | Marguerettaz et al. |
| 2012/0182375 | A1 | 7/2012 | Shourvarzi et al. |
| 2012/0197429 | A1 | 8/2012 | Nykyforov |
| 2014/0165265 | A1 | 6/2014 | Tulin et al. |
| 2014/0260854 | A1 | 9/2014 | Tokura et al. |
| 2014/0342903 | A1 | 11/2014 | Jarvis et al. |
| 2015/0030821 | A1 | 1/2015 | Costin, Sr. et al. |
| 2015/0079359 | A1 | 3/2015 | Costin, Jr. |
| 2015/0106993 | A1 | 4/2015 | Hoffman et al. |
| 2015/0119238 | A1 | 4/2015 | Pretsch et al. |
| 2015/0121965 | A1 | 5/2015 | Costin et al. |
| 2015/0134495 | A1 | 5/2015 | Naware et al. |
| 2015/0153278 | A1 | 6/2015 | Erkelenz et al. |
| 2015/0183231 | A1 | 7/2015 | Costin, Sr. et al. |
| 2015/0258699 | A1 | 9/2015 | Vander Woude |
| 2015/0298253 | A1 | 10/2015 | Constin, Jr. et al. |
| 2015/0343568 | A1 | 12/2015 | Constin, Jr. et al. |
| 2015/0361597 | A1 | 12/2015 | Candrian |
| 2016/0016879 | A1 | 1/2016 | Bertin et al. |
| 2016/0060807 | A1 | 3/2016 | Tharpe et al. |
| 2016/0251782 | A1 | 9/2016 | Liao et al. |
| 2016/0263928 | A1 | 9/2016 | Costin, Jr. et al. |
| 2016/0361937 | A1 | 12/2016 | Costin, Sr. et al. |
| 2016/0362820 | A1 | 12/2016 | Livecchi |
| 2020/0048825 | A1 | 2/2020 | Schultz et al. |

FOREIGN PATENT DOCUMENTS

| | | | |
|---|---|---|---|
| CN | 102371830 | A | 3/2012 |
| CN | 102704215 | A | 10/2012 |
| CN | 104687695 | A | 6/2015 |
| CN | 204398442 | U | 6/2015 |
| CN | 204653890 | U | 9/2015 |
| CN | 104983103 | A | 10/2015 |
| DE | 1965103 | A1 | 7/1971 |
| DE | 3916126 | A1 | 11/1990 |
| EP | 0328320 | A1 | 8/1989 |
| EP | 1279460 | A1 | 1/2003 |
| EP | 1459836 | A2 | 9/2004 |
| ES | 2147473 | A1 | 9/2000 |
| GB | 1259530 | A | 1/1972 |
| GB | 1294116 | A | 10/1972 |
| GB | 2199462 | A | 7/1988 |
| GB | 2294656 | A | 5/1996 |
| GB | 2448763 | A | 10/2008 |
| JP | 11291368 | A | 10/1999 |
| TW | M276842 | U | 5/1994 |
| WO | 8202689 | A1 | 8/1982 |
| WO | WO/2001/025824 | | 4/2001 |
| WO | 0214077 | A1 | 2/2002 |
| WO | 2004045857 | A2 | 6/2004 |
| WO | 2008072853 | A1 | 6/2008 |
| WO | 2010017648 | A1 | 2/2010 |
| WO | 2011143471 | A1 | 11/2011 |
| WO | 2012016316 | A1 | 2/2012 |
| WO | 2013137836 | A1 | 9/2013 |
| WO | 2015/042441 | A1 | 3/2015 |
| WO | WO/2015/042441 | | 3/2015 |
| WO | 2016065134 | A1 | 4/2016 |
| WO | WO/2018/035538 | | 2/2018 |
| WO | WO/2018/112110 | | 6/2018 |
| WO | WO/2018/112113 | | 6/2018 |
| WO | WO/2019/089857 | | 5/2019 |
| WO | WO/2019/169052 | | 6/2019 |
| WO | WO/2019/168879 | | 9/2019 |
| WO | WO/2019/241749 | | 12/2019 |

OTHER PUBLICATIONS

"Golden Laser Sep. 2016 part 1 captured on Oct. 24, 2019_11-51-54".pdf Golden Laser Sep. 3, 2016 website captured from archive.org. URL:"https://web.archive.org/web/20160903184306/https://www.goldenlaser.cc/jeans-laser-engraving-machine.html".

Golden Laser Oct. 18, 2014 http:www.youtube.com/watch?v=RHe32gwa7rA.

Technical Document: "Jeanologia The Science of Finishing Design Manual English Version," 73 pages, 2009, published by the Spanish company Jeanologia.

Video (screenshots/captures): "Lightelier," uploaded on Oct. 1, 2013 by user Jose Carlos Rodriguez, 12 pages, at URL: https://www.youtube.com/watch?v=FkyVvFx9X6Y.

Video (screenshots/captures): "e-Mark 3.0" uploaded on Apr. 7, 2016 by user Jeanologia, 24 pages, at URL: https//www.youtube.com/watch?v=2y26Oqu5fiA&feature=youtu.be.

Technical Document: "Jeanologia e-Mark Laser" Software Manual, 2015, 88 pages.

Technical Document: "GFK Laser System Easy Mar. 2012" Software Manual, 2012, 41 pages.

Video (screenshots/captures): "Lasers! Gas! Water-Proof Pants! How Levi Strauss & Co. Keeps Improving Jeans," uploaded Mar. 11, 2015 by user Fast Company, 14 pages, at URL: https://www.youtube.com/watch?v=nkMwmf57APU&t=151s.

Technical Document: "GFK Laser System Easy Mark 2011," Jeanologia, The Science of Finishing, 72 pages.

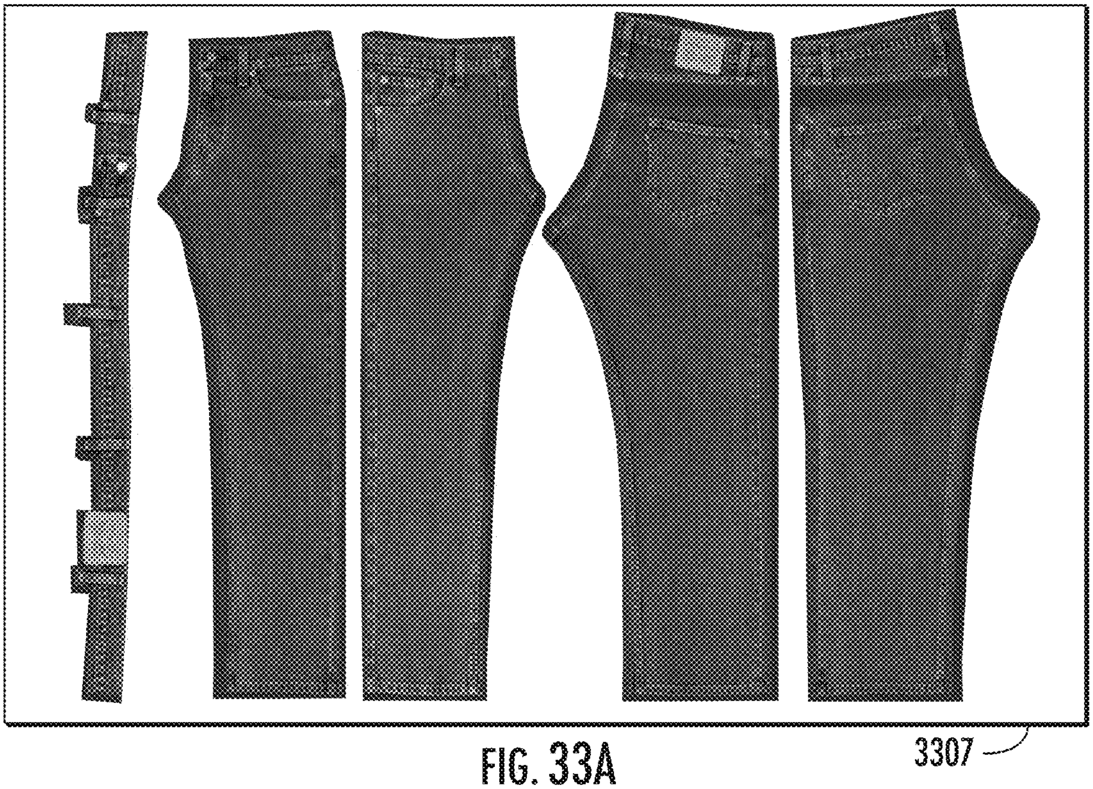
FIG. 33A
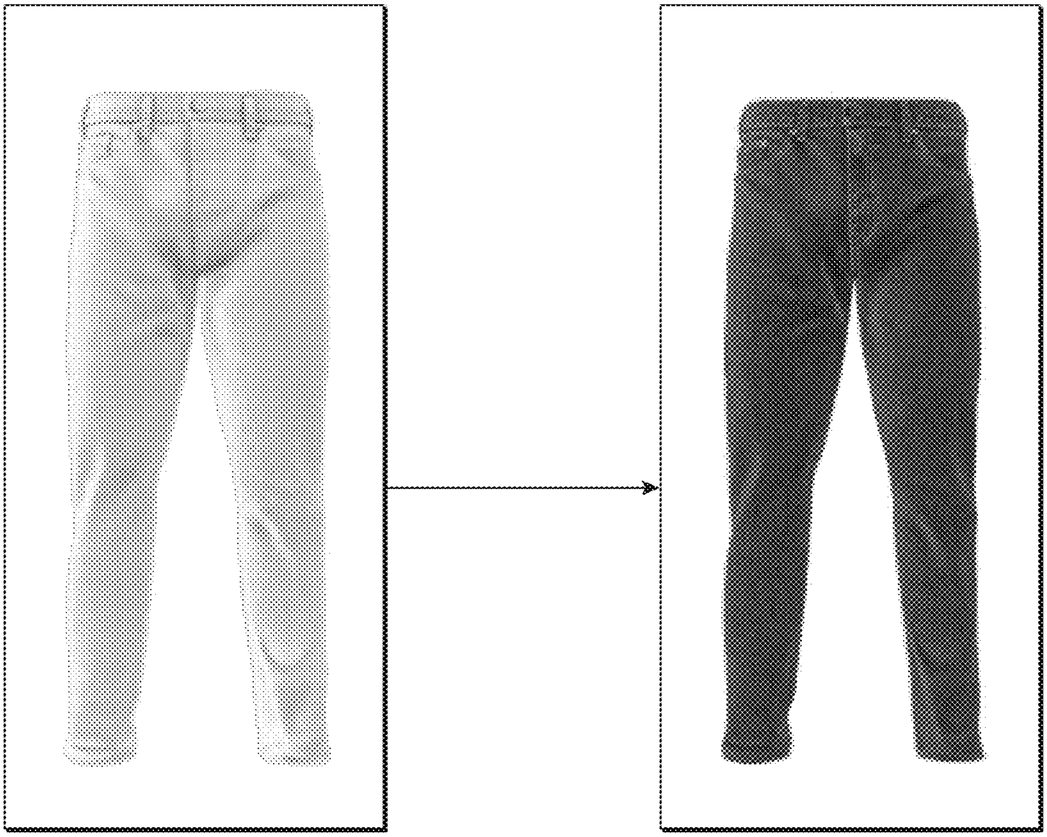
FIG. 33B
FIG. 33C

RENDERING A 3D GARMENT PREVIEW

CROSS-REFERENCE TO RELATED APPLICATIONS

This patent application is a continuation of U.S. patent application Ser. No. 18/187,621, filed Mar. 21, 2023, issued as U.S. Pat. No. 12,035,774 on Jul. 16, 2024, which is a continuation of U.S. patent application Ser. No. 16/701,113, filed Dec. 2, 2019, issued as U.S. Pat. No. 11,612,203 on Mar. 28, 2023, which claims the benefit of U.S. patent application 62/774,127, filed Nov. 30, 2018. These applications are incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for an improved process for finishing jeans that reduces environmental impact, processing time, and processing costs, while maintaining the look and style of traditional finishing techniques. There is a need for tool to creating and previewing patterns on jeans before laser finishing.

BRIEF SUMMARY OF THE INVENTION

A tool allows a user to create new designs for apparel and preview these designs in three dimensions before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

In an implementation, a method includes providing a garment previewing tool that allows previewing on a computer screen of a jeans garment customized by the user with a finishing pattern created using a laser input file by a laser. The garment previewing tool includes: providing an option for the user to select a jeans garment base and upon the user's selection, showing a first garment preview image on the computer screen including a jeans base image for the selected garment base; providing an option for the user to select a wear pattern from a menu of wear patterns, where each wear pattern is associated with a laser input file to be used by a laser to produce that wear pattern onto a jeans garment; after the wear pattern is selected, showing a second garment preview image on the computer screen including the selected wear pattern in combination with the jeans base image, where the second garment preview image replaces the first garment preview image; in the second garment preview image, allowing the user to select the wear pattern and modify a sizing of the wear pattern relative to the jeans base image, where as the user makes changes, the modified sizing of the wear pattern is displayed to the user in real time; in the second garment preview image, allowing the user to select the wear pattern and modify a position of the wear pattern relative to the jeans base image, where as the user makes changes, the modified positioning of the wear pattern is displayed to the user in real time; and showing a third garment preview image on the computer screen including the jeans base image and selected wear pattern, with modified sizing or modified positioning, or a combination.

Further, a preview image generated by the garment previewing tool is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

The method can further include: providing a target pair of jeans corresponding to the jeans garment base selected by the user; and based on laser input file associated with the third garment preview image including the selected wear pattern with modified sizing or modified positioning, or a combination, using a laser to create a finishing pattern on an outer surface of the target jeans.

In an implementation, a method includes providing a garment previewing tool that allows previewing on a computer screen of a garment customized by the user with a finishing pattern created using a laser input file by a laser.

The garment previewing tool includes: providing an option for the user to select a garment base and upon the user's selection, showing a first garment preview image on the computer screen including a base image for the selected garment base; providing an option for the user to select a pattern from a menu of patterns, where each pattern is associated with a laser input file; after the pattern is selected, showing a second garment preview image on the computer screen including the selected pattern in combination with the base image, where the second garment preview image replaces the first garment preview image; in the second garment preview image, allowing the user to select the pattern and alter a sizing of the pattern relative to the base image, where as the user makes changes, the altered sizing of the pattern is displayed to the user in real time; in the second garment preview image, allowing the user to select the pattern and alter a position of the pattern relative to the base image, where as the user makes changes, the altered positioning of the pattern is displayed to the user in real time; and showing a third garment preview image on the computer screen including the base image and selected pattern, with altered sizing or altered positioning, or a combination.

Further, a preview image generated by the garment previewing tool is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

In an implementation, a method includes providing a garment previewing tool that allows previewing on a computer screen of a jeans garment customized by the user with a finishing pattern created using a laser input file by a laser. The garment previewing tool includes: providing an option for the user to select a jeans garment base and upon the user's selection, showing a first garment preview image on the computer screen including a jeans base image for the selected garment base; providing an option for the user to select a wear pattern from a menu of wear patterns, where each wear pattern is associated with a laser input file to be used by a laser to produce that wear pattern onto a jeans garment; after the wear pattern is selected, showing a second garment preview image on the computer screen including the selected wear pattern in combination with the jeans base image, where the second garment preview image replaces the first garment preview image; in the second garment preview image, allowing the user to select the wear pattern and modify a sizing of the wear pattern relative to the jeans base image, where as the user makes changes, the modified sizing of the wear pattern is displayed to the user in real time; in the second garment preview image, allowing the user to select the wear pattern and modify a position of the wear pattern relative to the jeans base image, where as the user makes changes, the modified positioning of the wear pattern is displayed to the user in real time; and showing a third garment preview image on the computer screen including the jeans base image and selected wear pattern, with modified sizing or modified positioning, or a combination.

Further, a preview image generated by the garment previewing tool is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

The method can further include: providing a target pair of jeans corresponding to the jeans garment base selected by the user; and based on laser input file associated with the third garment preview image including the selected wear pattern with modified sizing or modified positioning, or a combination, using a laser to create a finishing pattern on an outer surface of the target jeans. The second garment preview image can be generated by: generating an adjusted base image from the jeans base image without the selected wear pattern; generating a pattern mask based on the laser input file associated with the selected wear pattern; for a pixel at a pixel location of the second preview image, obtaining a first contribution for the pixel location of the second preview image by combining a first value for a pixel corresponding to the pixel location for the pattern mask and a pixel corresponding to the pixel location for the jeans base image; for the pixel at the pixel location of the second preview image, obtaining a second contribution at the pixel location for the second preview image by combining a second value for a pixel corresponding to the pixel location for the pattern mask and a pixel corresponding to the pixel location for the adjusted base image; combining the first contribution and second contribution to obtain a color value for a pixel at the pixel location for the second preview image, and displaying the color value for the pixel at the pixel location in the second preview image.

In an implementation, a method includes generating a preview image on a computer screen of a garment with a finishing pattern created using a laser input file by a laser. The generating the preview includes: providing a base image of the assembled garment without the finishing pattern; generating an adjusted base image from the base image of the assembled garment without the finishing pattern; generating a pattern mask based on the laser input file; for a pixel at a pixel location of the preview image, obtaining a first contribution for the pixel location of the preview image by combining a first value for a pixel corresponding to the pixel location for the pattern mask and a pixel corresponding to the pixel location for the base image; for the pixel at the pixel location of the preview image, obtaining a second contribution at the pixel location for the preview image by combining a second value for a pixel corresponding to the pixel location for the pattern mask and a pixel corresponding to the pixel location for the adjusted base image; combining the first contribution and second contribution to obtain a color value for a pixel at the pixel location for the preview image; and displaying the generated preview image on the computer screen including the color value for the pixel at the pixel location.

Further, a preview image generated is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

In an implementation, a method includes providing a garment previewing tool that allows previewing on a computer screen of a garment customized by the user with a finishing pattern including a damage asset created using a damage asset laser input file by a laser, where the garment previewing tool includes: providing an option for the user to select a garment base and upon the user's selection, showing a first garment preview image on the computer screen including a base image for the selected garment base; providing an option for the user to select a damage asset from a menu of damage assets, where each damage asset is associated with a damage asset laser input file; after the damage asset is selected, showing a second garment preview image on the computer screen including the selected damage asset in combination with the base image, where the second garment preview image replaces the first garment preview image; in the second garment preview image, allowing the user to select the damage asset and alter a sizing of the damage asset relative to the base image, where as the user makes changes, the altered sizing of the damage asset is displayed to the user in real time; in the second garment preview image, allowing the user to select the damage asset and alter a position of the damage asset relative to the base image, where as the user makes changes, the altered positioning of the damage asset is displayed to the user in real time; and showing a third garment preview image on the computer screen including the base image and selected damage asset, with altered sizing or altered positioning, or a combination.

Further, a preview image generated is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

The damage asset can be created by: creating a damage shape in a black color and storing in a damage asset laser input file, where the damage shape is associated with the damage asset; based on the damage asset laser input file, using a laser to form the digital asset on a fabric; capturing an image of the damage asset on the fabric, and using the image of the damage asset in the second garment preview image.

In an implementation, a method includes: creating a first damage shape in a black color; creating a second damage shape in a black color, where the second damage shape is different from the first damage shape; storing the first damage shape and second damage shape in a damage asset laser input file; based on the damage asset laser input file, using a laser to form holes in a fabric based on the first and second damage shapes; washing the fabric with the holes; capturing a first image of a first hole in the fabric that corresponds to the first shape; capturing a second image of a second hole in the fabric that corresponds to the second shape; using the first image as a first damage asset; using the second image as a second damage asset; providing a garment previewing tool that allows previewing on a computer screen of a garment customized by the user with a finishing pattern including one or more damage assets to be created using a laser; in the garment previewing tool, providing an option for the user to select a damage asset from a menu of damage assets including the first damage asset and the second damage asset; when the user selects the first damage asset, showing the first image as part of a preview image of a garment being customized by the user; and when the user selects the second damage asset, showing the second image as part of the preview image of a garment being customized by the user.

Further, a preview image generated is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

In an implementation, a method includes: assembling a garment made from fabric panels of a woven first material including a warp including indigo ring-dyed cotton yarn, where the fabric panels are sewn together using thread; creating an image of a damage shape in a single color; storing the damage shape a damage asset laser file; based on the damage asset laser file, using a laser to form a hole in a second material based on the damage shape; washing the second material with the hole; capturing an image of the hole in the second material that corresponds to the damage shape; using the image of the hole in the second material as a preview image of damage asset; allowing a user to select the damage asset using the preview image for use on the garment; using a laser to create the damage asset on an outer surface of the garment based on a laser input file including the damage shape, where based on the laser input file, at a location specified for damage asset, the laser forms a hole in the first material in a shape corresponding the damage shape. Other objects, features, and advantages of the present invention will become apparent upon consideration of the following detailed description and the accompanying drawings, in which like reference designations represent like features throughout the figures.

Further, a preview image generated is a three-dimensional preview image of the jeans garment after a postlaser wash, simulated to have an appearance when worn by a person (with simulated wrinkling or shadowing on the garment), and is rotatable in three dimensions to be viewed from an angle selected by the user.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 33A shows a created shadow neutral texture. FIG. 33B shows a front view of a three-dimensional model, which the shadow neutral texture will be applied or mapped to. FIG. 33C shows a result of mapping the shadow neutral texture to the three-dimensional model. FIG. 33D shows a back or rear view of the three-dimensional model, which the shadow neutral texture will be applied or mapped to.

DETAILED DESCRIPTION OF THE INVENTION

Figure 1:
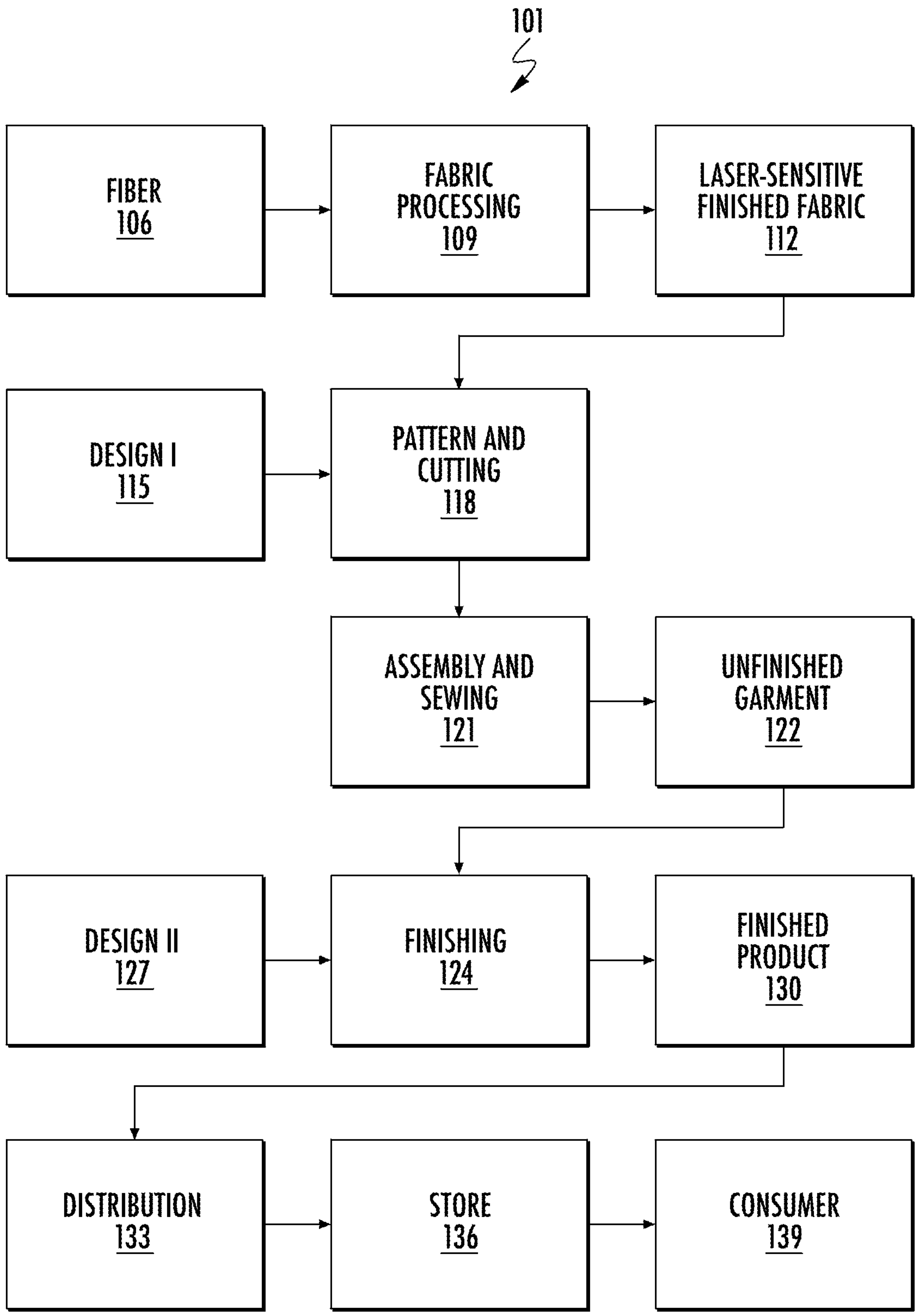
FIG. 1 shows a block diagram of a system for creating, designing, producing apparel products with laser finishing.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional finishing 124, which includes laser finishing. The finishing may include tinting, washing, softening, and fixing. For distressed denim products, the finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, are incorporated by reference along with all other references cited in this application.

Design 127 is for postassembly aspects of a garment while design 115 is for preassembly aspects of a garment. After finishing, a finished product 130 (e.g., a pair of jeans) is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
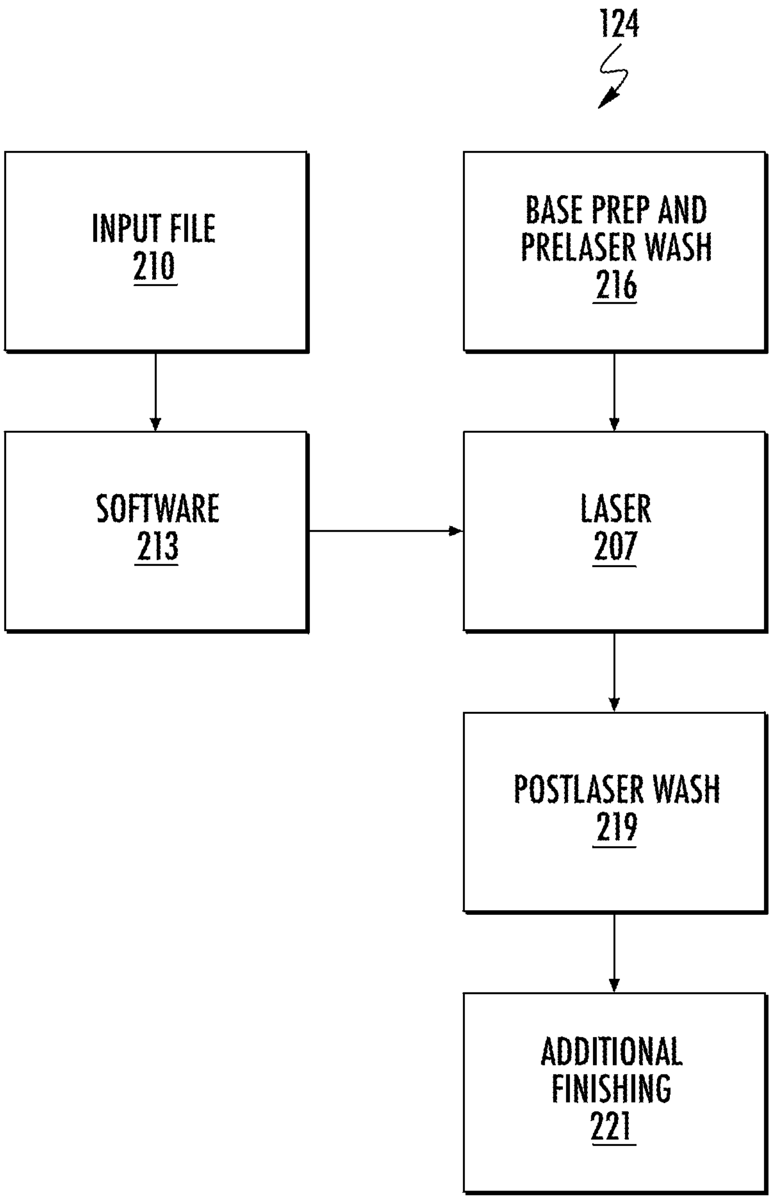
FIG. 2 shows a flow for a finishing technique that includes the use of a laser.

FIG. 2 shows a finishing technique 124 that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. U.S. patent applications 62/433,739, filed Dec. 13, 2016, and Ser. No. 15/841,263, filed Dec. 13, 2017, which are incorporated by reference, describe a denim material with enhanced response characteristics to laser finishing. Using a denim material made from indigo ring-dyed yarn, variations in highs and lows in indigo color shading is achieved by using a laser.

U.S. patent applications 62/715,788, filed Aug. 7, 2018; 62/636,108, 62/636,107, and 62/636,112, filed Feb. 27, 2018; Ser. No. 15/682,507, filed Aug. 21, 2017; Ser. No. 15/841,268, filed Dec. 13, 2017; and 62/579,863 and 62/579,867, filed Oct. 31, 2017 are incorporated by reference.

Laser finishing can be used on denim and also other materials too. Laser finishing can be used to alter the coloration of any material where the sublimation (or decomposition in some cases) temperature of the dye or the material itself is within range of the operating temperatures of the laser during use. Color change is a product of either the removal of dyestuff or the removal of material uncovering material of another color.

Figure 3:
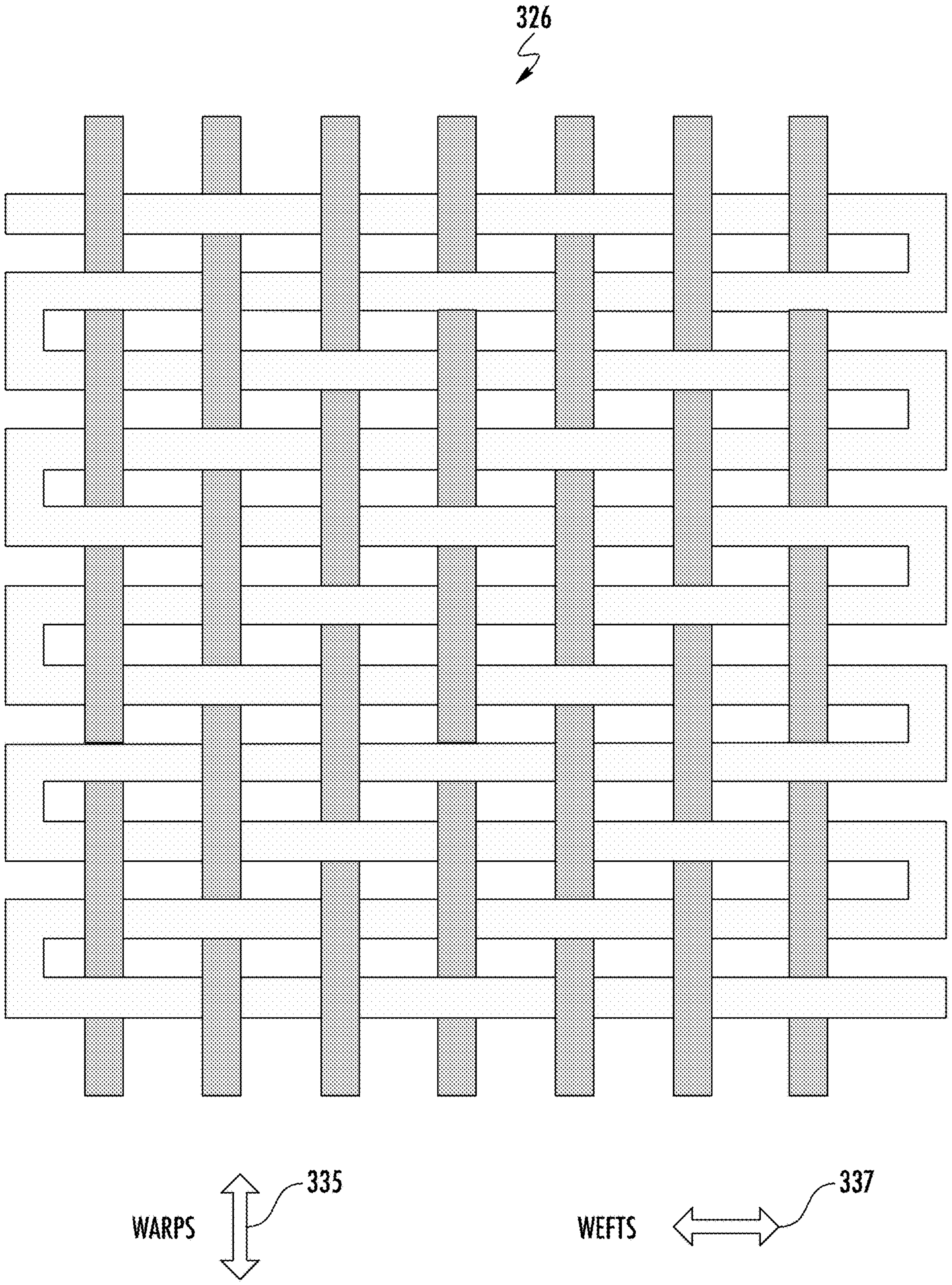
FIG. 3 shows a weave pattern for a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In another implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, clastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

Figures 4, 5, 6, 7:
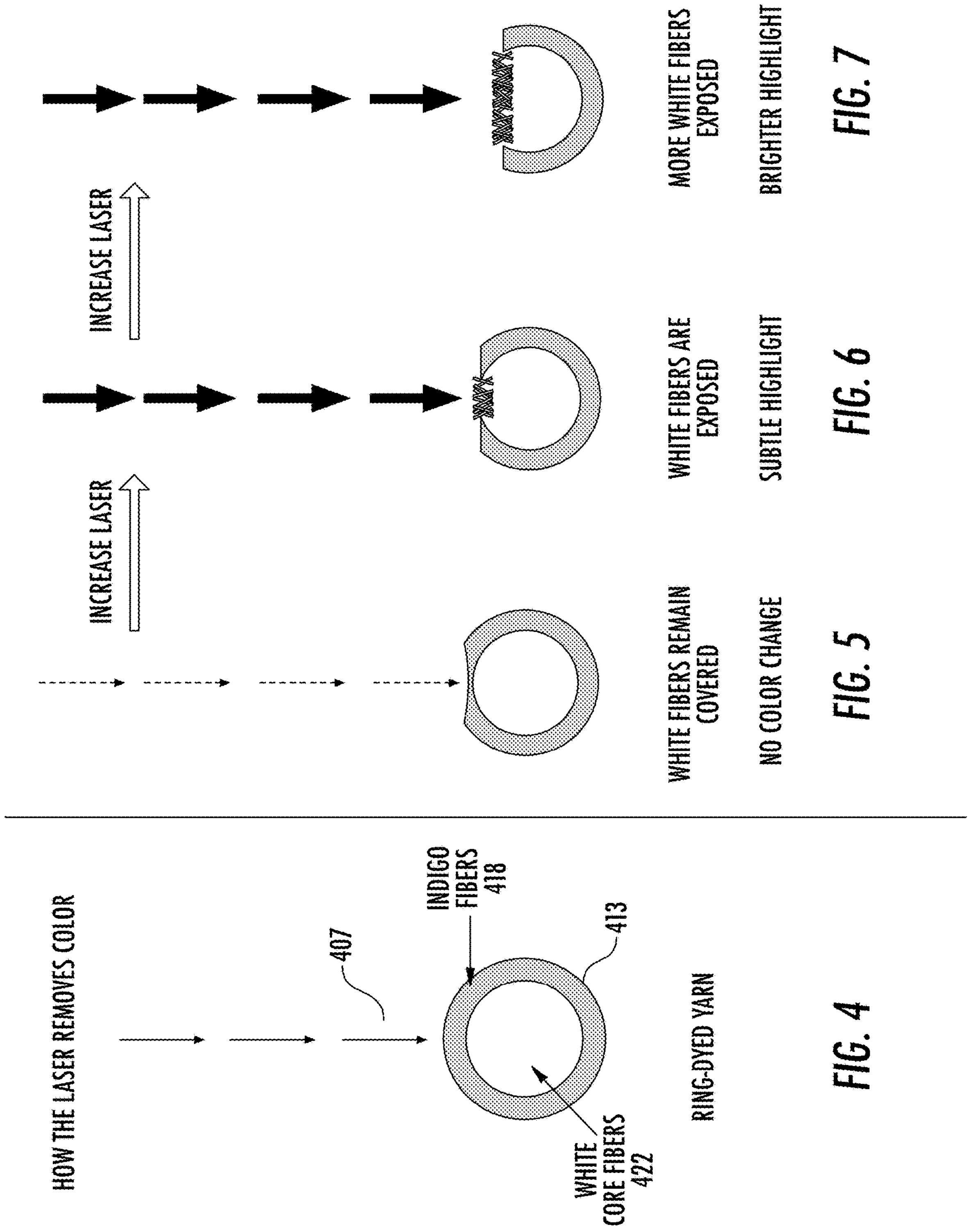
FIGS. 4-7 show how the laser alters the color of ring-dyed yarn.

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burning). By the postlaser machine washing, the coloration due to the charring will be removed. There can be additional finish 221, which may be including tinting, softening, or fixing, to complete finishing.

Damage (e.g., holes, openings, or rips) can also be burned by the laser onto a garment. After lasering, the damage will appear as a whitish or yellowish region on the garment, because the laser has removed or largely removed the indigo warp yarn or its indigo-colored outer ring while leaving or mostly leaving the whitish color of the inner core or the white (or other color) weft yarn material, or both. The damage hole is not yet open and still joined together by the fine strands of yarn. However, after postlaser wash, due to the mechanical action of machine washing, the damage on the garment will open up have a shredded appearance which results from because the fine yarn strands are broken. Damage assets are discussed further in U.S. patent application Ser. No. 16/177,387, filed Oct. 31, 2018, and 62/579,863, filed Oct. 31, 2017, which are incorporated by reference.

Figure 8:
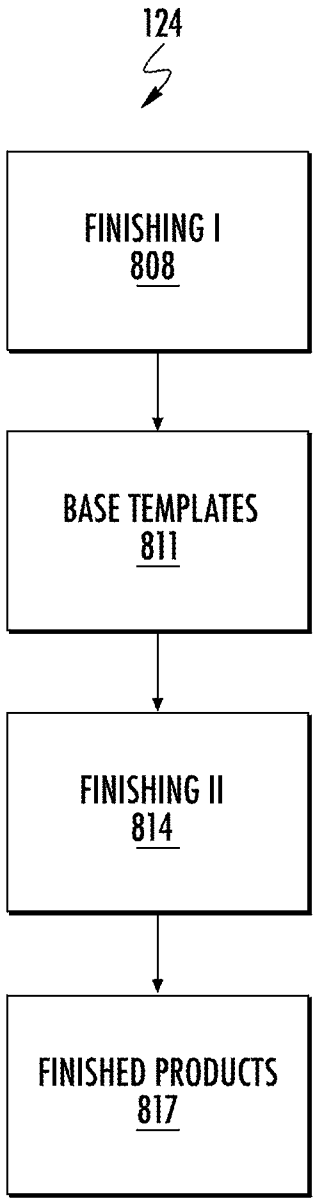
FIG. 8 shows a flow for finishing in two finishing steps and using base templates.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
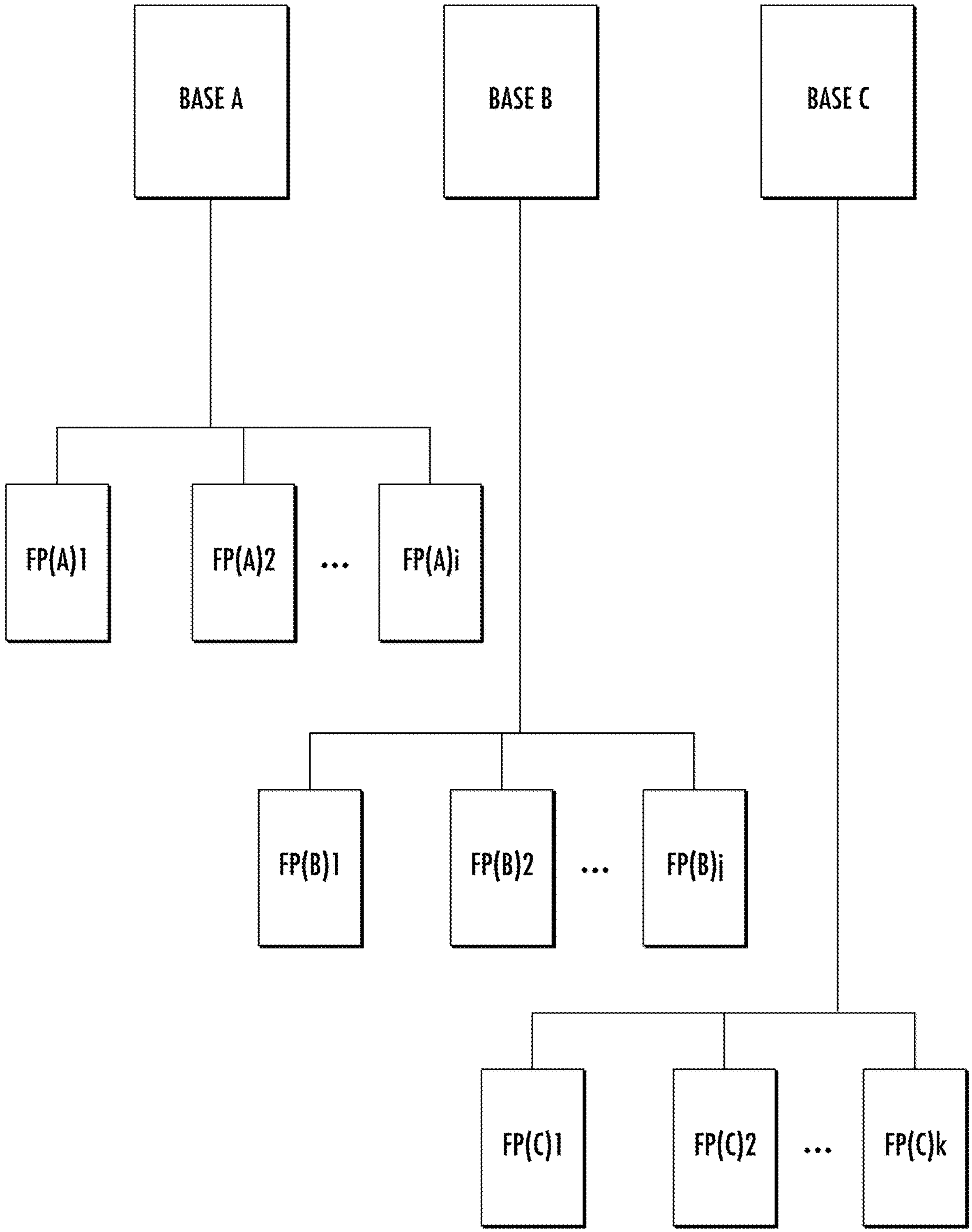
FIG. 9 shows multiple base templates and multiple resulting finished products from each of these templates.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post laser wash 219 and additional finishing 221. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Greater numbers of products can be achieved by using, changing, or varying the amount of damage. For example, from the same base fit fabric, there can be a first finished garment product FP(B)D0 without damage. A second finished garment product FP(B)D1 can have damage in a first particular positioning or first level (e.g., less damage or smaller holes). A third finished garment product FP(B)D2 can have damage in a second particular position (different from the first particular positioning) or second level (e.g., more damage or larger holes). In this way, more products can be obtained from the same base. And even more products can be obtained by combining varying damage and other variables, such as postlaser wash recipe, laser finish pattern, and tinting during postlaser wash (or may applied by, for example, spraying, just before postlaser wash).

Tinting can be used to give garments a used, vintage, or muddy appearance. Greater numbers of products can be achieved by using, changing, or varying the amount of tinting after laser finishing, such as during postlaser wash or applying, for example, by spraying, just before postlaser wash. For example, tinting is available in many different colors and shades of colors. Some examples of tinting colors include yellow, ecru, brown, red, green, blue, pink, cyan, magenta, and black. Tinting is used to change hue, cast, or tone of the indigo.

For example, from the same base fit fabric, there can be a first finished garment product FP(B)T0 without tint. A second finished garment product FP(B)T1 can tinting of a first color or first level. A third finished garment product FP(B)T2 can have tinting of a second color or second level, different from the second finished garment product. In this way, more products can be obtained from the same base. And even more products can be obtained by combining tinting and varying damage and other variables.

Figure 10:
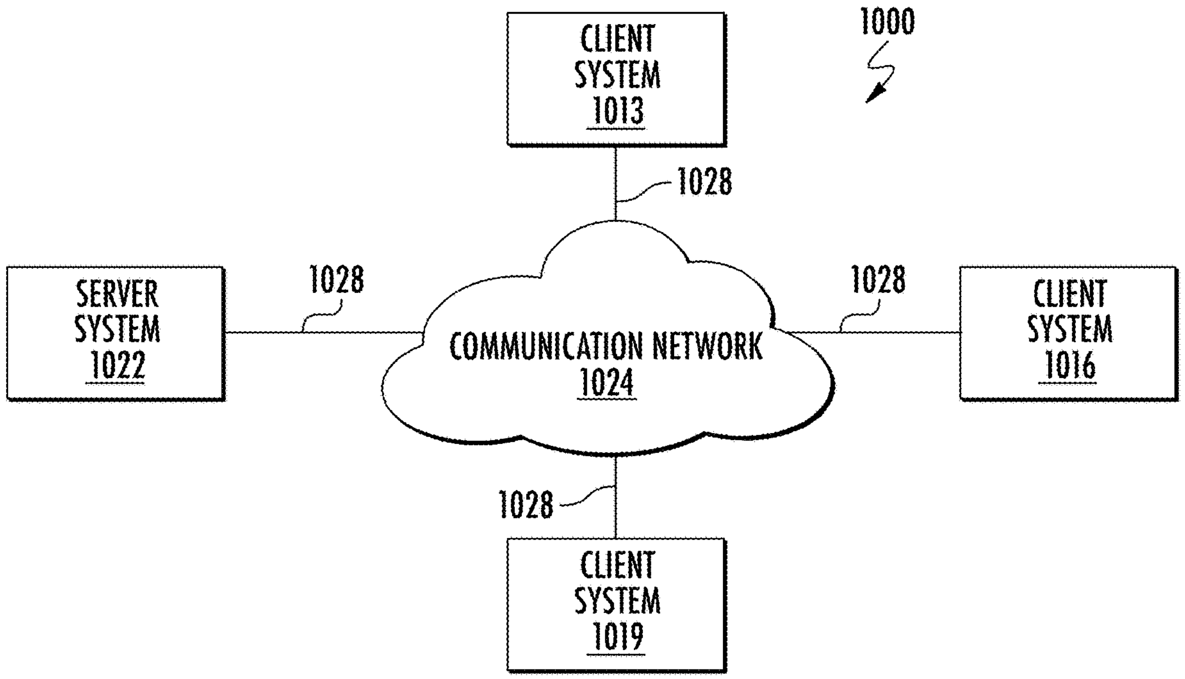
FIG. 10 shows a distributed computer network.

A system incorporating laser finishing can include a computer to control or monitor operation, or both. FIG. 10 shows an example of a computer that is component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
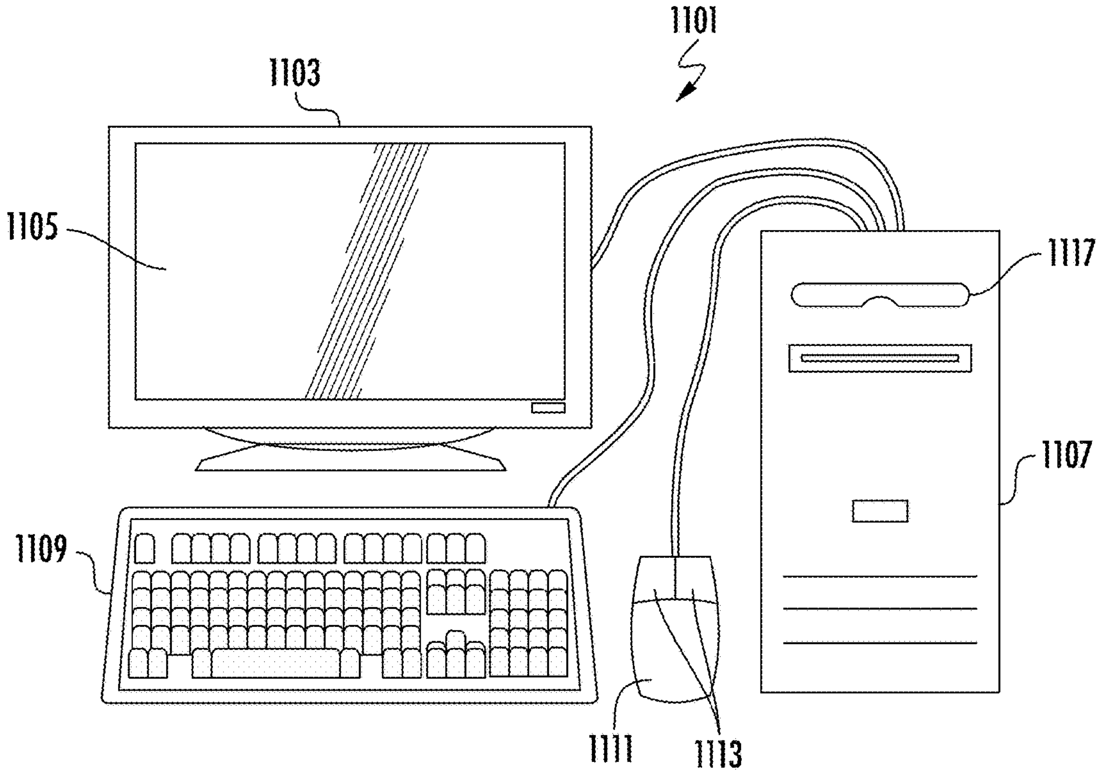
FIG. 11 shows a computer system that can be used in laser finishing.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad, Apple iPad Pro, or Apple iPad mini), Apple iPod (e.g, Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD−R, DVD+R, DVD−RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
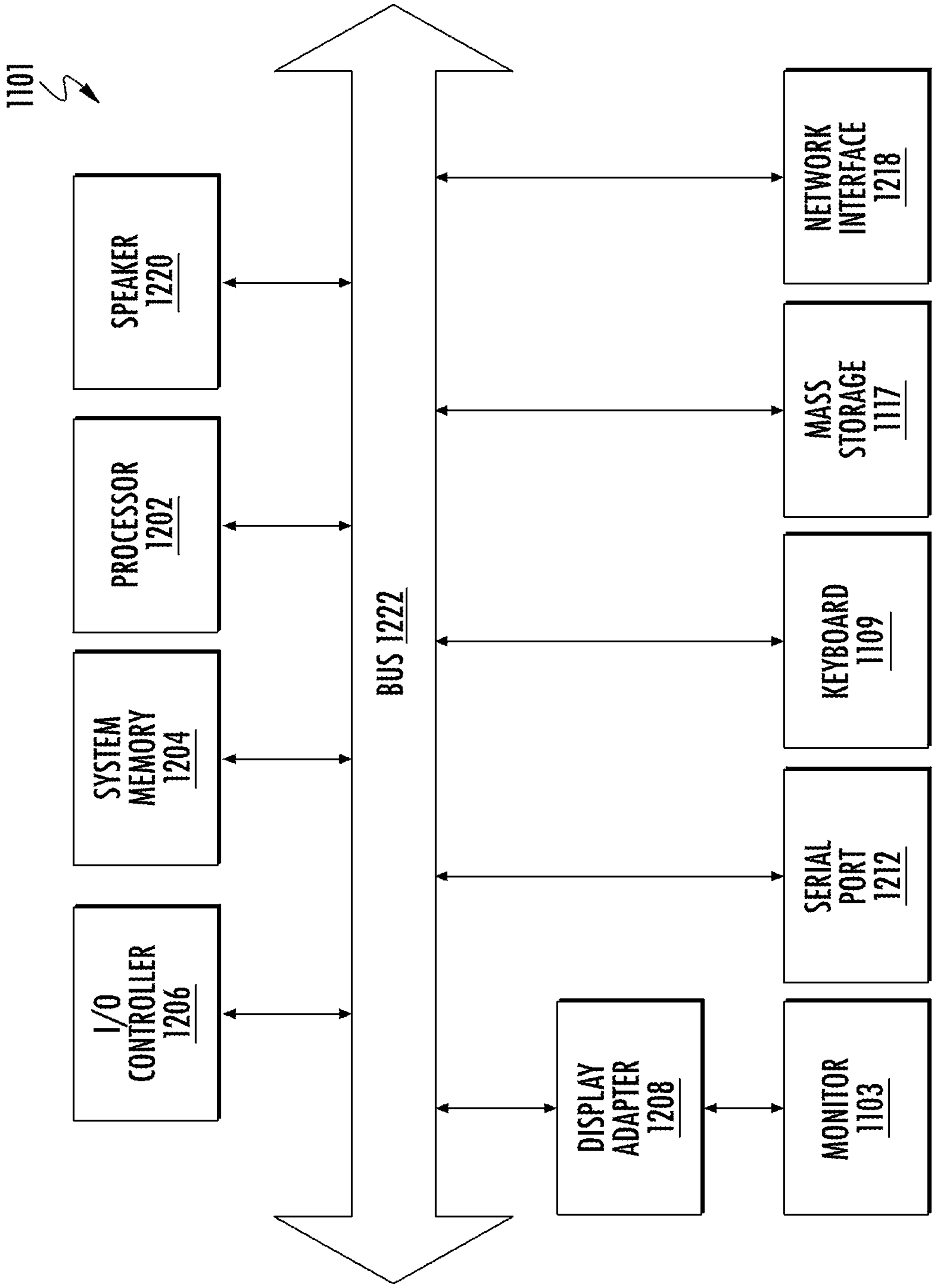
FIG. 12 shows a system block diagram of the computer system.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1×RDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
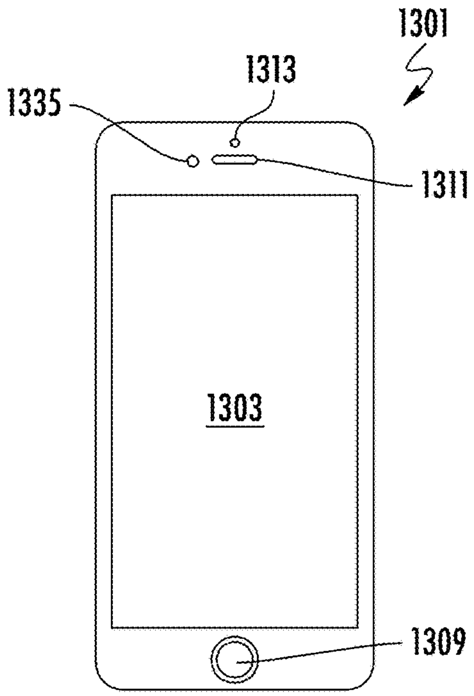
FIGS. 13-14 show examples of mobile devices.
Figure 14:
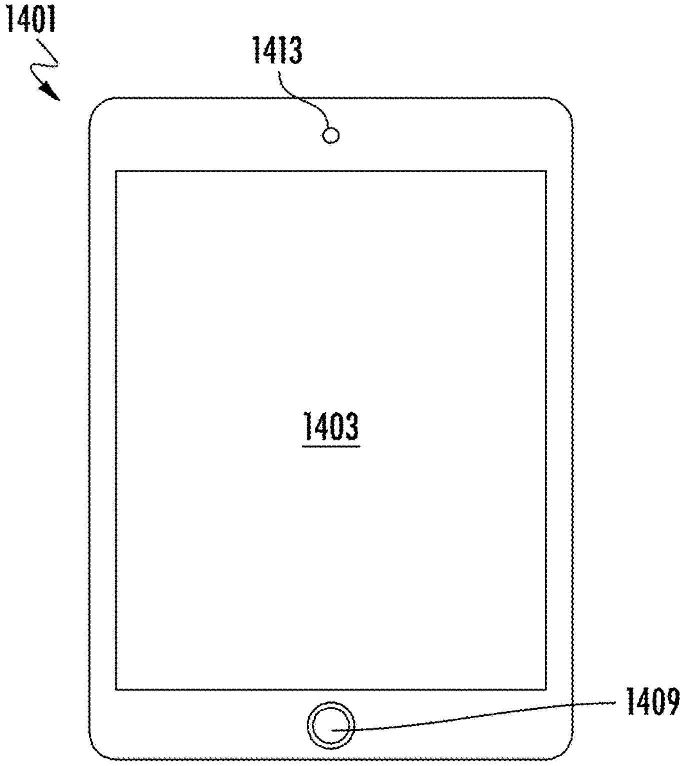

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
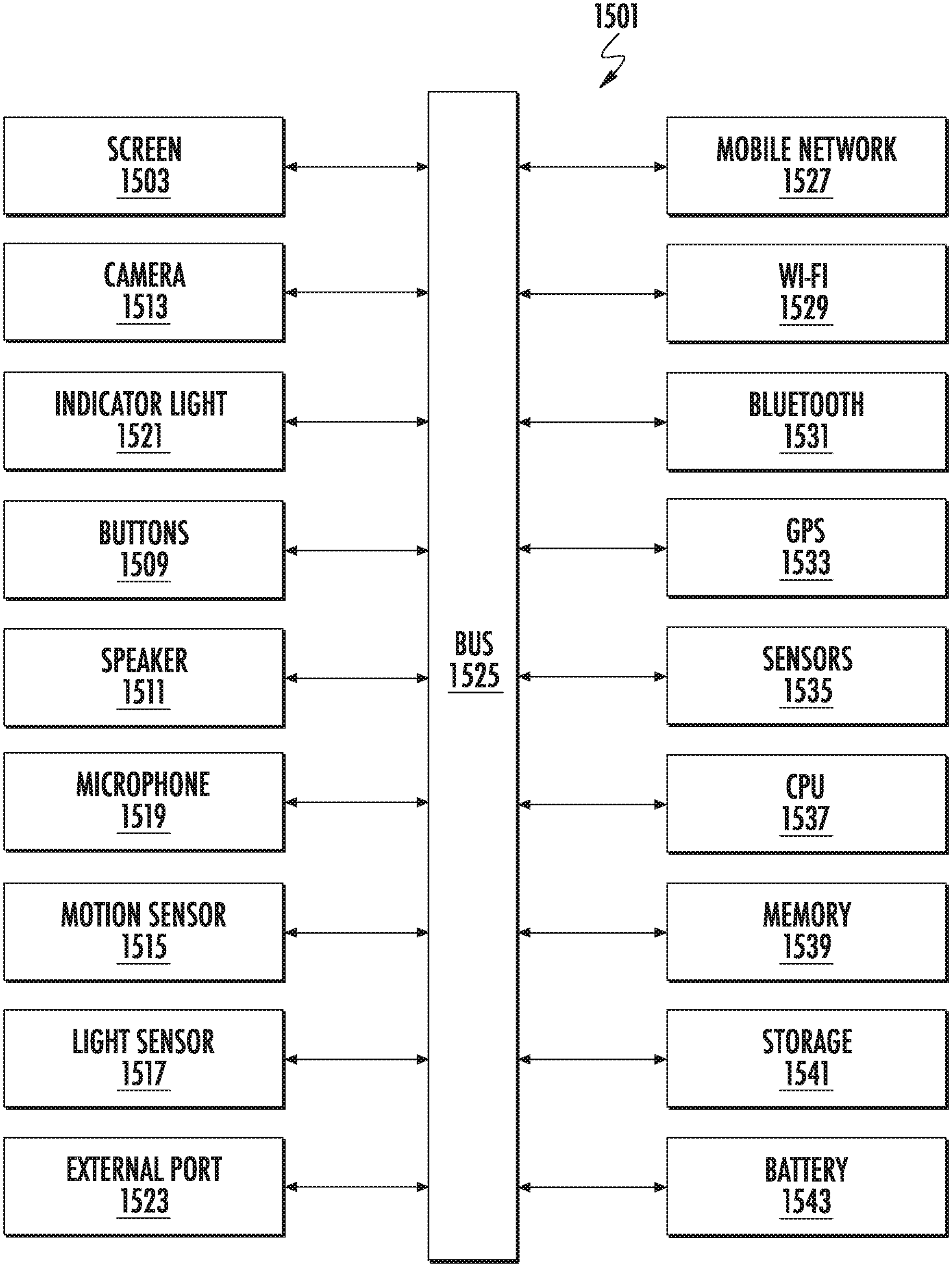
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g., nonvolatile memory), and battery 1543 (lithium ion or lithium polymer cell). The battery supplies power to the electronic components and is rechargeable, which allows the system to be mobile.

Figure 16:
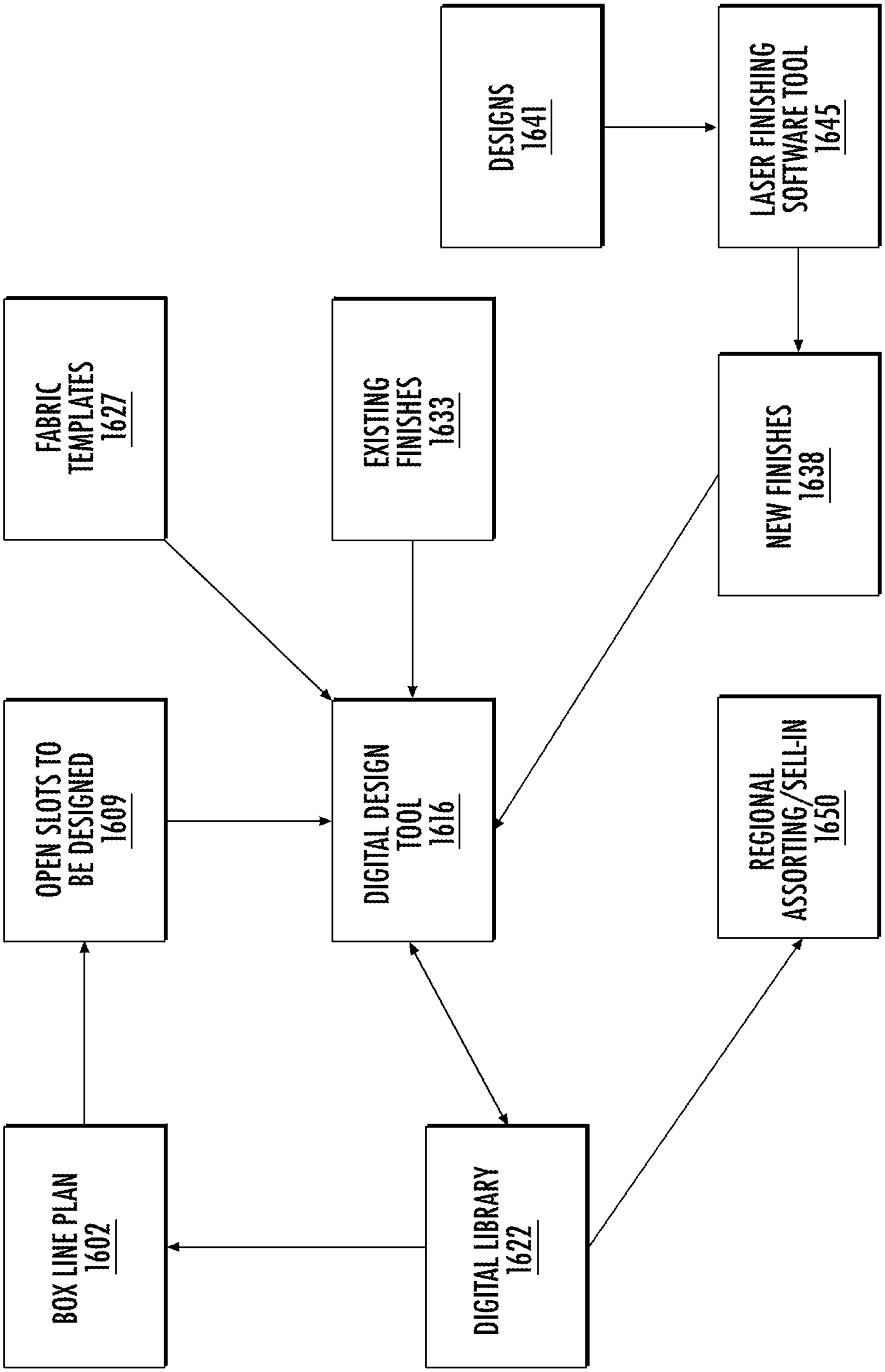
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3-D or 3D) graphics.

U.S. patent applications 62/433,746, filed Dec. 13, 2016, and Ser. No. 15/841,268, filed Dec. 13, 2017, which are incorporated by reference, describe a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used be produce a multitude of laser finishes. Operational efficiency is improved.

Designers can use the digital design tool to design products that are used to satisfy the requests in open slots 1609. Designs created using the digital design tool can be stored in a digital library 1622. Input to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used to populate or satisfy the box line plan.

Figure 17:
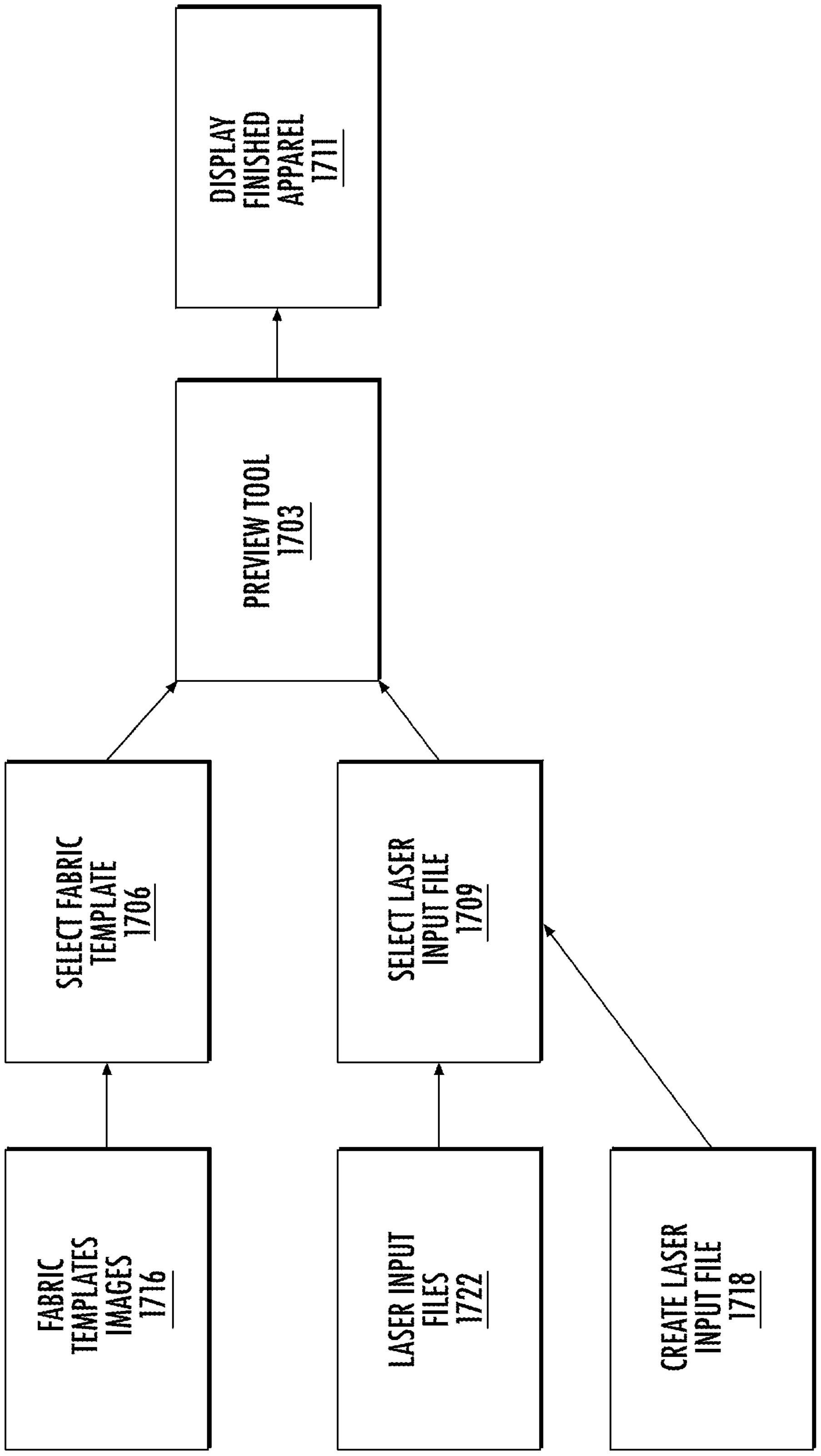
FIG. 17 shows a block diagram of a specific implementation of a preview tool.

FIG. 17 shows a block diagram of a specific implementation of a digital design tool, a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned with the selected laser input file, without needing to actually laser or burn the jeans.

With the preview tool, the appearance of the garment (e.g., jeans) will be of the finished garment product that the consumer will see (e.g., after postlaser wash). As discussed above, after laser finishing, the garment will have charred appearance, and damage holes will still be connected by fine yarns, and will not yet be tinted. After postlaser wash, the charring and yellowish hue due to the laser ash and residue will be washed away. The damage holes or openings will be opened and typically have a shredded appearance. The garment will have the selected tinting (e.g., color and level of color).

The preview tool displays on a screen or other visual output a preview image 1711 of the garment as it would appear to the consumer, after post laser wash. The preview image 1711 will be a photorealistic image in color. The preview image may be displayed in using a 8-bit or greater color depth, 16-bit or greater color depth, 24-bit or greater color depth, or 32-bit or greater color depth. This is in contrast to a computer screen at operator's console of a laser finishing machine, which typically only shows black and white images. The console is primarily used for alignment rather than design, and using black and white images can provide increased contrast (as compared to color images) which aids the operator in achieving proper alignment.

The console is directly attached or connected to the laser, while the preview tool is front end tool that executes remotely from the computer and connected via a network. The preview tool can be directly attached or connected to the laser, but typically not because laser finishing is typically performed at a different physical location from where garments are designed. For example, a design facility may be in San Francisco, while the laser finishing center may be Las Vegas or outside the United States (e.g., China, Mexico, Bangladesh, Sri Lanka, Vietnam, India, Malaysia, Indonesia, Egypt, Brazil, and others).

After a garment has been designed and previewed using the preview tool, the information can be transferred via the network to the laser finishing tool and its console. For example, the preview tool can execute on a desktop computer, mobile device (e.g., smartphone or tablet computer), or using a Web browser.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of a jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), a file 1718 created by the user, or a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn, make any manual changes or alterations to the pattern (such as additional changes to a vintage jean pattern in a digital image file) and preview the results again. The preview tool allows a user to make and see changes, to the user can obtain feedback faster than having to laser jeans to see the results and also avoiding unneeded waste (e.g., preliminary versions of burned jeans).

Each digital representation can be saved as separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A table below presents a pseudocode computer program listing of sample software code for a specific implementation of a preview tool 1703 for displaying finished apparel 1711 for a given fabric template input (e.g., base fit fabric image) and laser input file. A specific implementation of the source code may be written in a programming language such as Python. Other programming languages can be used.

TABLE

PREVIEW PATTERN TOOL

```
SETUP: file selection object
GET: input file from user selection
ASSIGN: default blur options for high and low settings
ASSIGN: input and conversion dpi settings
FUNCTION: Import File (File List, File Index):
  IMPORT: file being previewed
  COMPUTE AND SET: resolution conversion factor
  CALCULATE: optional resized image for use during preview
  RETURN: input file and resized input file
RUN: Import File (File List, File Index)
CREATE: plotting object to display results to user
SETUP: custom colors for preview options
ASSIGN: color and color separation variables
SETUP: graphical user interface interactions buttons, sliders, etc.
FUNCTION: Update (Value):
  READ: current display settings
  CHECK: which user interactions are being changed
  ASSIGN: operation variable value
  PERFORM: user specified operation
  REDRAW: plot of image preview to user
FUNCTION: Reset (Event):
  RESET: all default settings for image preview
FUNCTION: Change Color (color):
  SET: color of base color for preview
  REDRAW: plot of image preview to user
PLOT: current state of file object
```

A specific version of the preview tool overlays a fabric template input file and a laser input file, and then generates an image to display them together as a representation of the laser-finished apparel. The laser input file is aligned to the garment in the fabric template input file, so that the positioning of features in the laser input file are at appropriate positions or places on the garment. The alignment may be by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear of simulate the look of a garment had been burned by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to more properly simulate the look of a garment more closely with a burned garment. Dots per inch refers to the number of dots in a printed inch. The more dots, the higher the quality of the print (e.g., more sharpness and detail). By reducing the dpi of the image, this will reduce the image quality, resulting a blurring of the image. In an implementation, the preview tool reduces a dpi of the combined image, to be of less dpi than the fabric template input file or the laser input file. By blurring the preview image, this results in improved simulation that corresponds better to a burned laser garment. When burning a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

Figure 18:
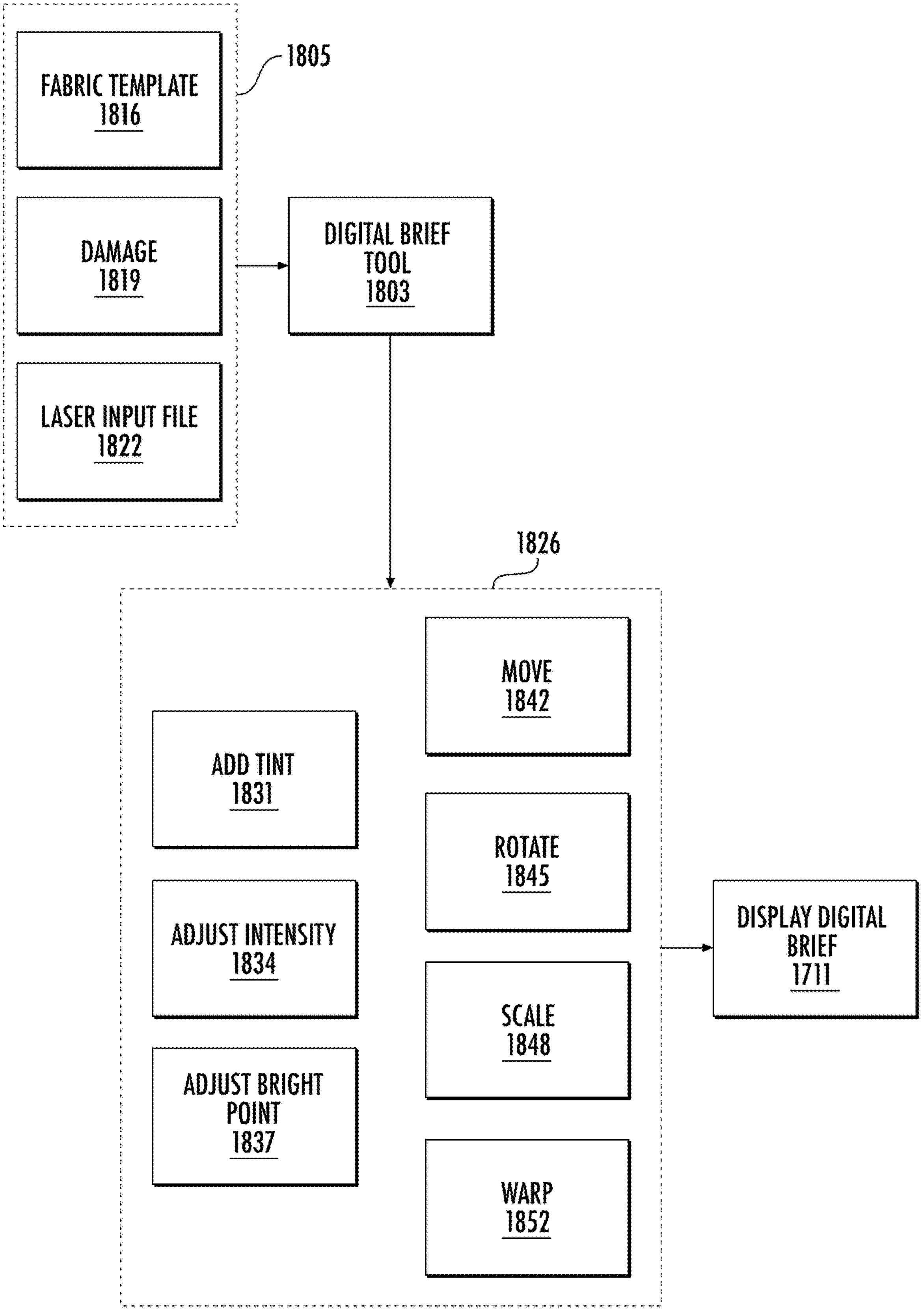
FIG. 18 shows a block diagram of a brief tool.

FIG. 18 shows a block diagram of a digital brief tool 1803, which also like preview tool 1703, provides a real-time preview of an appearance of pair of jeans when a finishing pattern is applied by burning using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

As input, the digital brief tool takes three types of digital assets 1805, fabric template input 1816, damage input 1819, and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the postlaser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
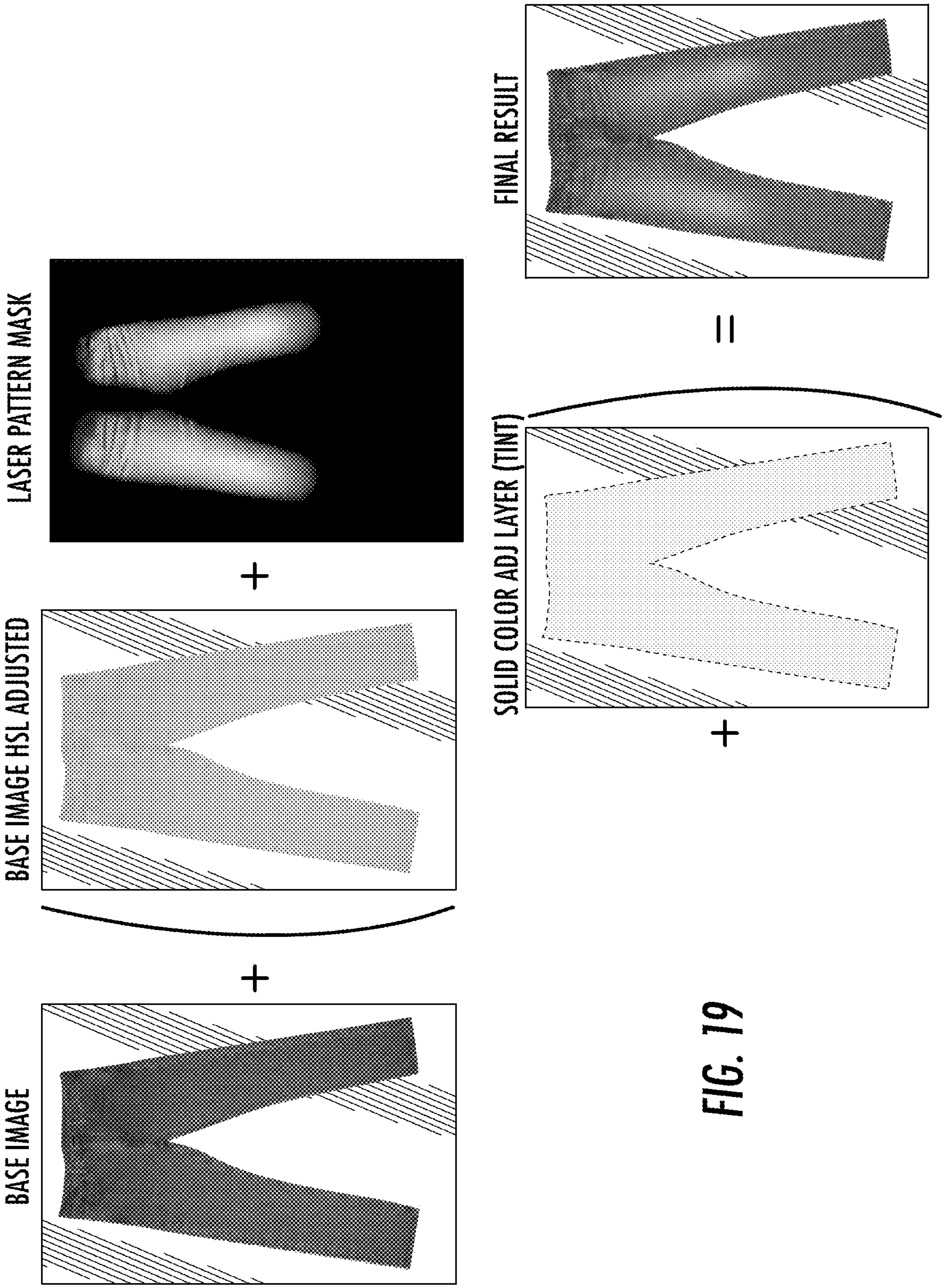
FIG. 19 shows a technique of generating a preview of a finished image using a brief tool.

FIG. 19 shows a technique of generating a preview of a finished image using a digital brief tool. A base image (or fabric template input) is selected. A hue saturation lightness (HSL) adjustment layer is created or generated for the selected base image. The HSL adjustment layer can be the base layer with an adjustment for hue saturation lightness. When tinting is selected, a solid color adjustment layer is created or generated.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning will be proportionally somewhere in between.

Figure 20:
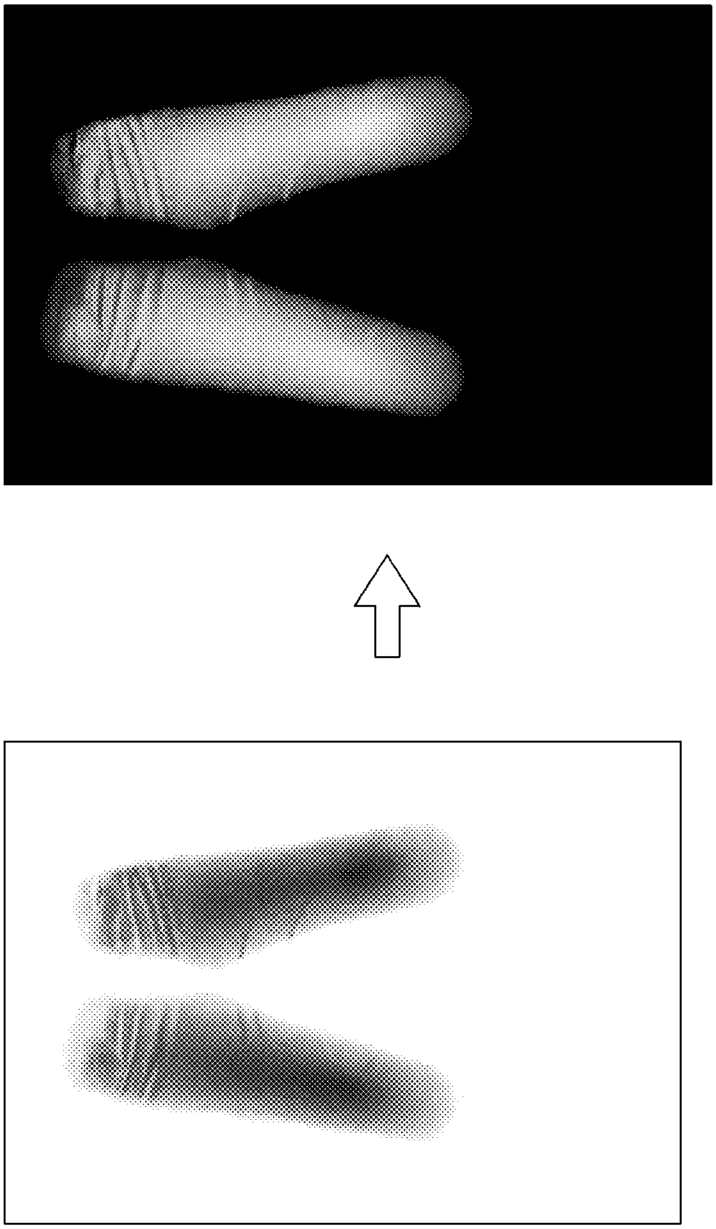
FIG. 20 shows a laser pattern mask that is created from a laser input file.

FIG. 20 shows a laser pattern mask that is created from a laser input file. The digital brief tool creates the laser pattern mask from the laser input file by reversing the laser input file. So, for the laser pattern mask, a black pixel means the pixel is not lasered (which results in the original indigo color of the fabric), and a white pixel means the pixel will be lasered at the highest level (which results in the whitest color that can be achieved on the fabric).

Figure 21:
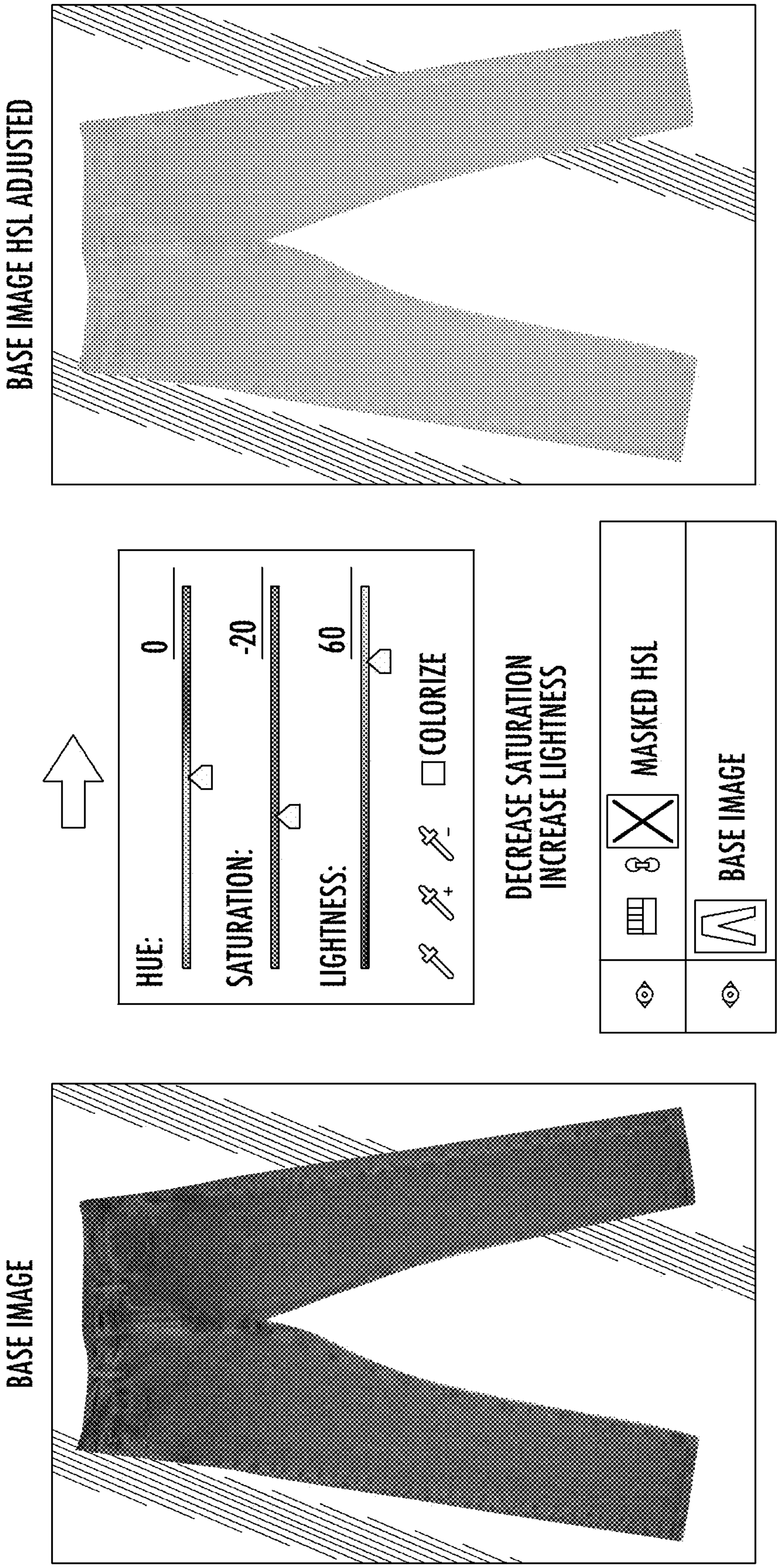
FIG. 21 shows a base image hue saturation lightness adjustment (HSL) layer that is created from the base image.

FIG. 21 shows an HLS adjustment layer that is created from the base image. The HLS adjustment layer (or adjustment layer) is like a bleaching layer, which is an image of what the jeans would appear like if the jeans were fully bleached or lasered. This layer is created by taking the base image and adjusting its hue, saturation, and lightness. In an implementation, for this layer, the saturation is reduced compared to the base layer, and the lightness is increased compared to the base layer. And the hue is not adjusted compared to the base layer.

A technique of the digital brief tool is to combine the base image and adjustment layer based on the laser pattern mask. For a black pixel in the laser pattern mask, the base layer will fully pass (and none of the adjustment layer) through to the final result image. For a white pixel in the laser pattern mask, the adjustment layer (and none of the base layer) will fully pass through to the final result image. For gray pixel values, then a percentage of the base layer and adjustment layer will pass through to the final result image. For example, for a value in the layer pattern mask, 90 percent of the base layer and 10 percent of the adjustment layer pass through to the final result image.

Figure 22:
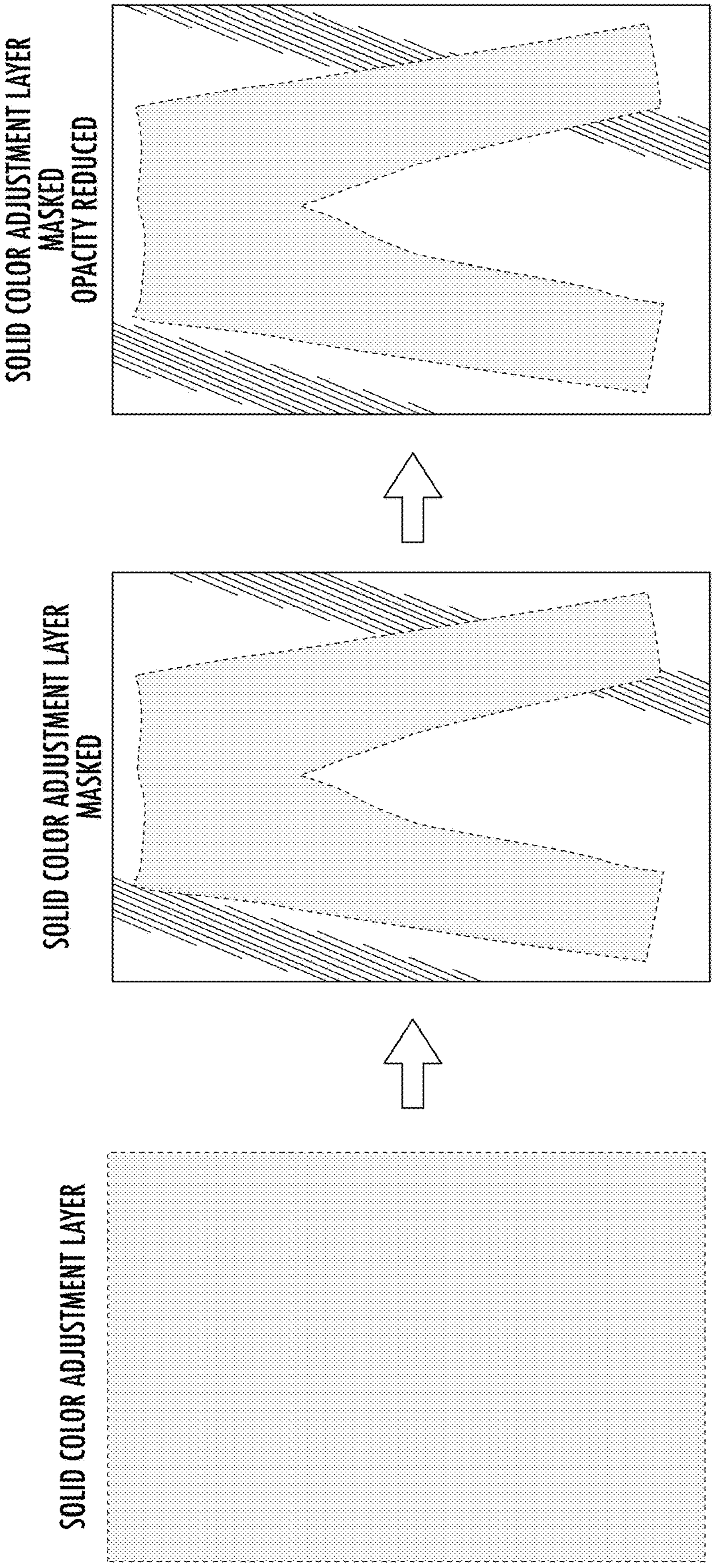
FIG. 22 shows a technique of creating a masked solid color adjustment layer.

FIG. 22 shows a technique of creating a masked solid color adjustment layer. The digital brief tool creates the solid color adjustment layer by creating a layer of a solid color, mask this layer based on the base image, and then create masked solid color adjustment layer. An opacity of the masked solid color adjustment layer can be reduced, so that when combined with the based image, the base image will pass through with some tinting contributed by the masked solid color adjustment layer.

Figure 23:
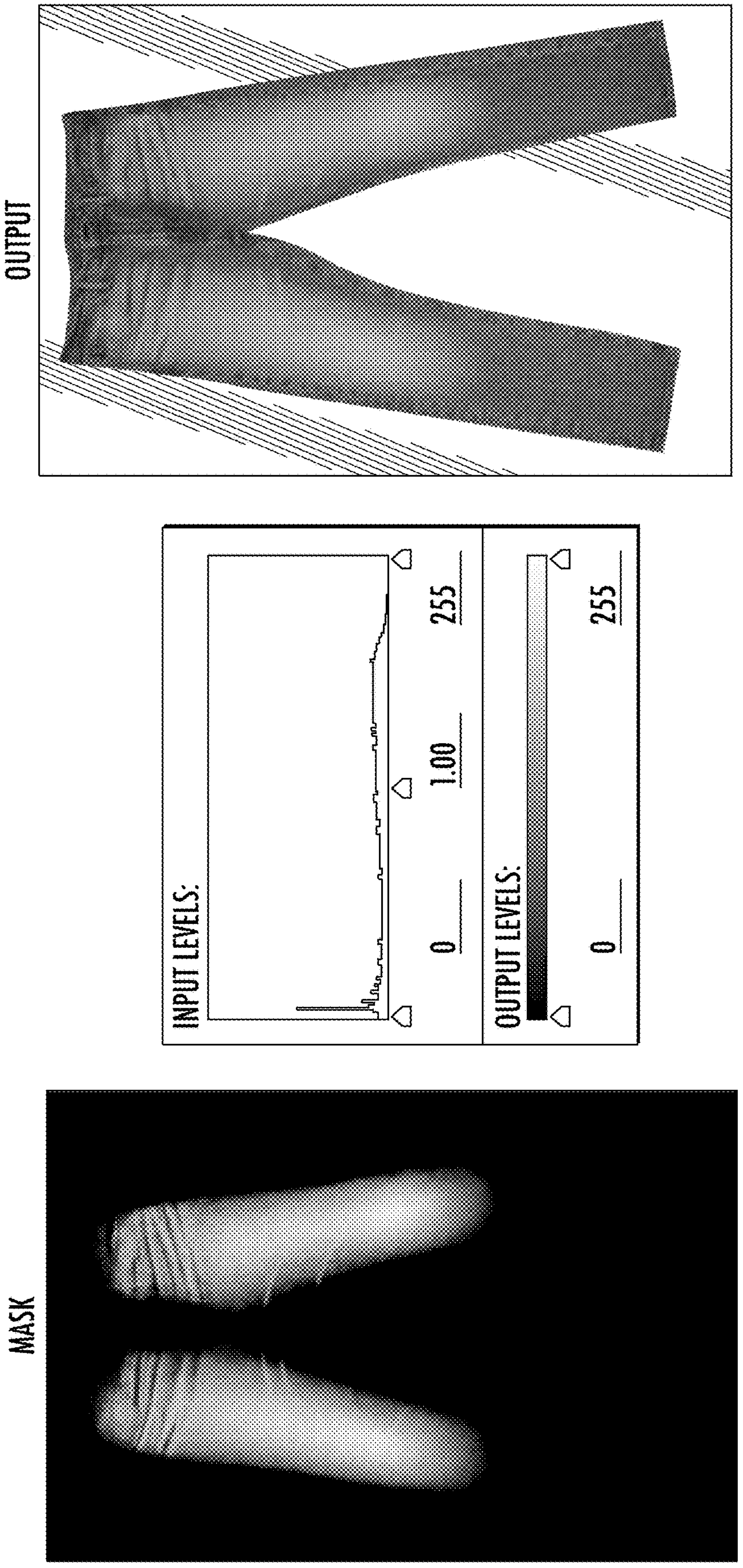
FIGS. 23-24 shows examples of two different adjustments for bright point.
Figure 24:
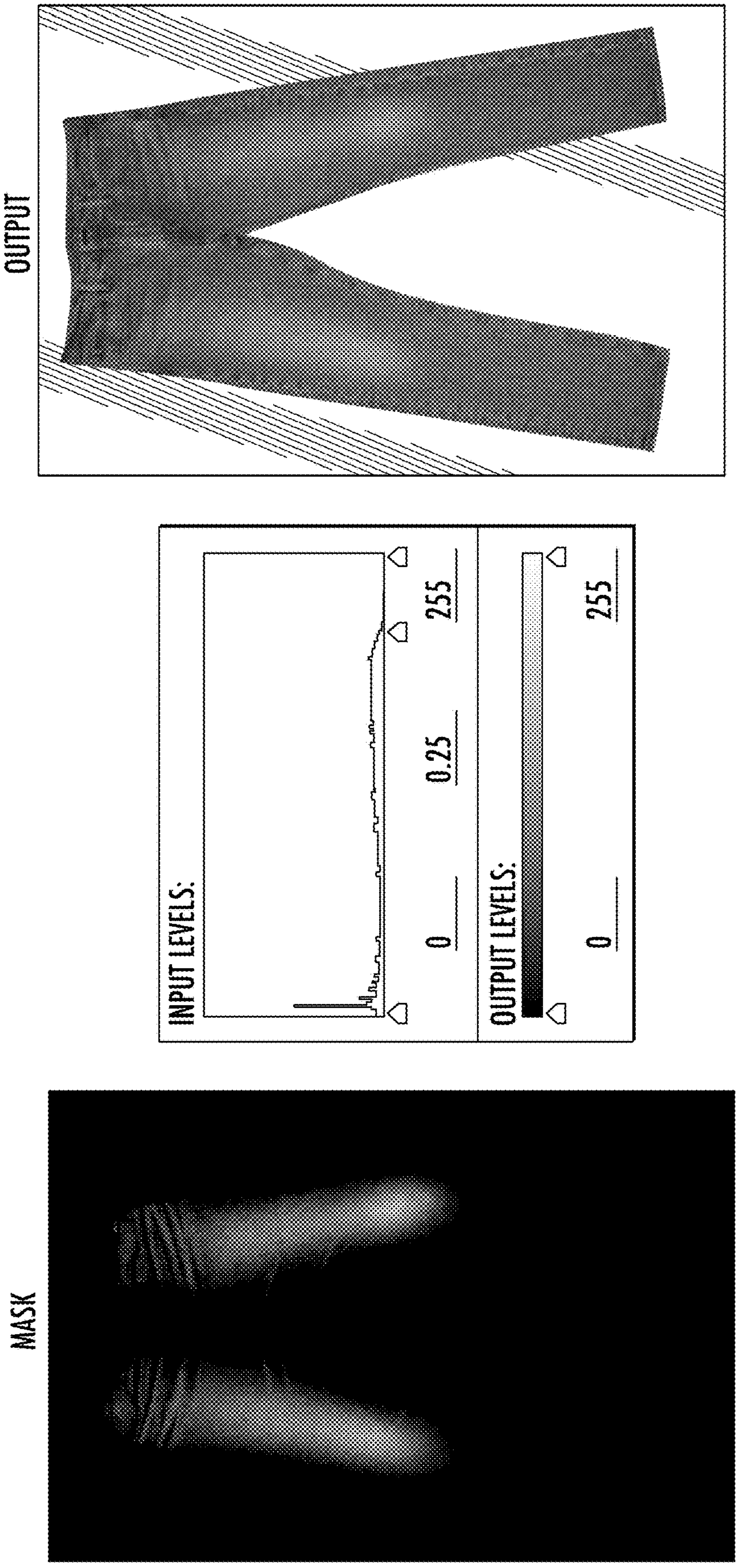

FIGS. 23-24 show examples of two different adjustments or settings for a bright point operation. Adjusting bright point adjusts a rate of transition from middle gray to white on the layer mask.

Figure 25:
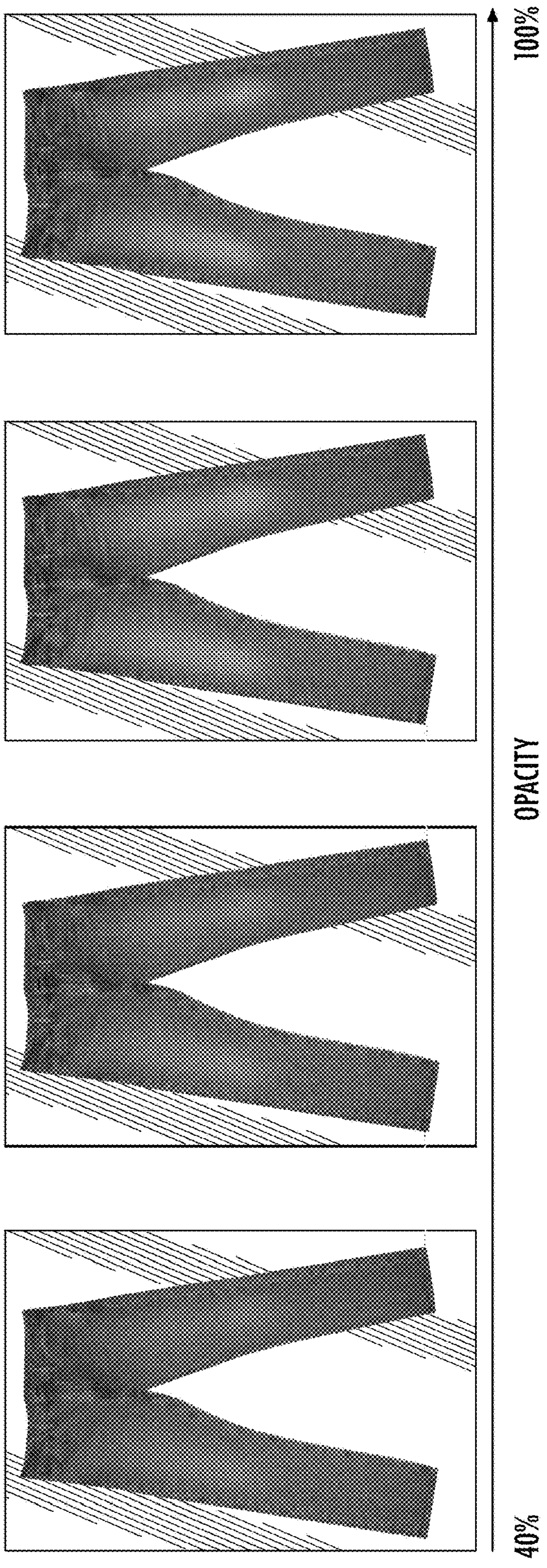
FIG. 25 shows adjustment of intensity.

FIG. 25 shows adjustment of intensity. The intensity adjustment adjusts an opacity (e.g., 40 percent to 100 percent) of an HSL adjustment layer. At 100 percent, the HSL adjustment layer will be fully opaque, and the wear pattern will be very prominent in the brief image or preview.

Figure 26:
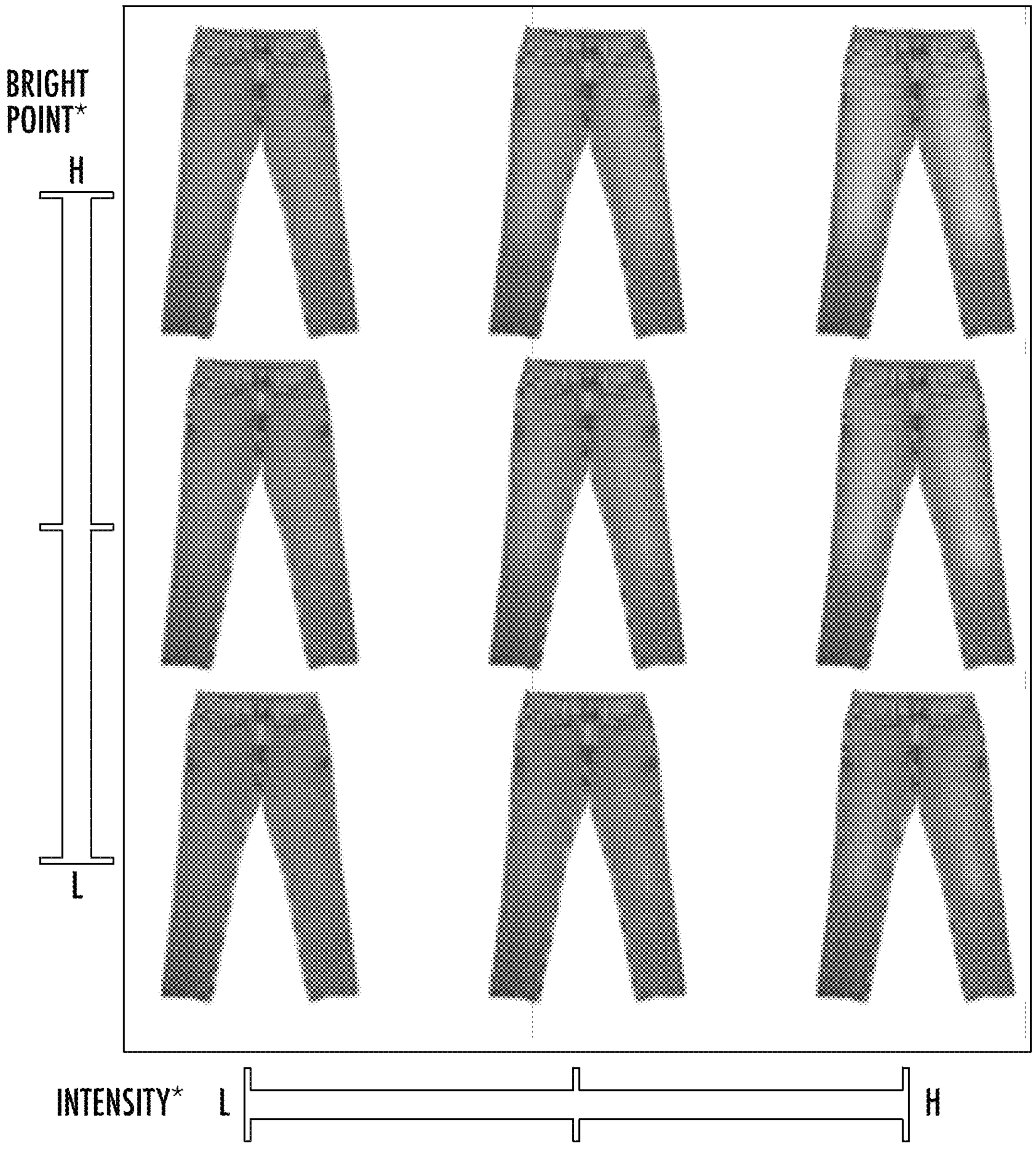
FIG. 26 shows an array of images showing the effects of adjustments in bright point and intensity.

FIG. 26 shows an array of images showing the effects of adjustments in bright point and intensity. Intensity changes are shown in an X or row direction, while bright point changes are shown in a Y or column direction.

For a first jeans in the first column (from a left of the array), third row (from a top of the array), the bright point and intensity are both L, indicating the least amount of bright point and intensity. A second jeans is in the second column, third row; this jeans has a bright point of L and an intensity between L and H. The wear pattern of the second jeans is more visible than that for the third jeans. A third jeans is in the third column, third row; this jeans has a bright point of L and an intensity of H, indicating the greatest amount of intensity. The wear pattern of the third jeans is more visible than that for the second jeans.

A fourth jeans is in the third column, second row; this jeans has a bright point between L and H, and an intensity of H. The size or area of the wear pattern of the fourth jeans is larger than that for the third jeans. A fifth jeans is in the third column, first row; this jeans has a bright point of H and an intensity of H. The size or area of the wear pattern of the fifth jeans is larger than that for the fourth jeans.

Figure 27:
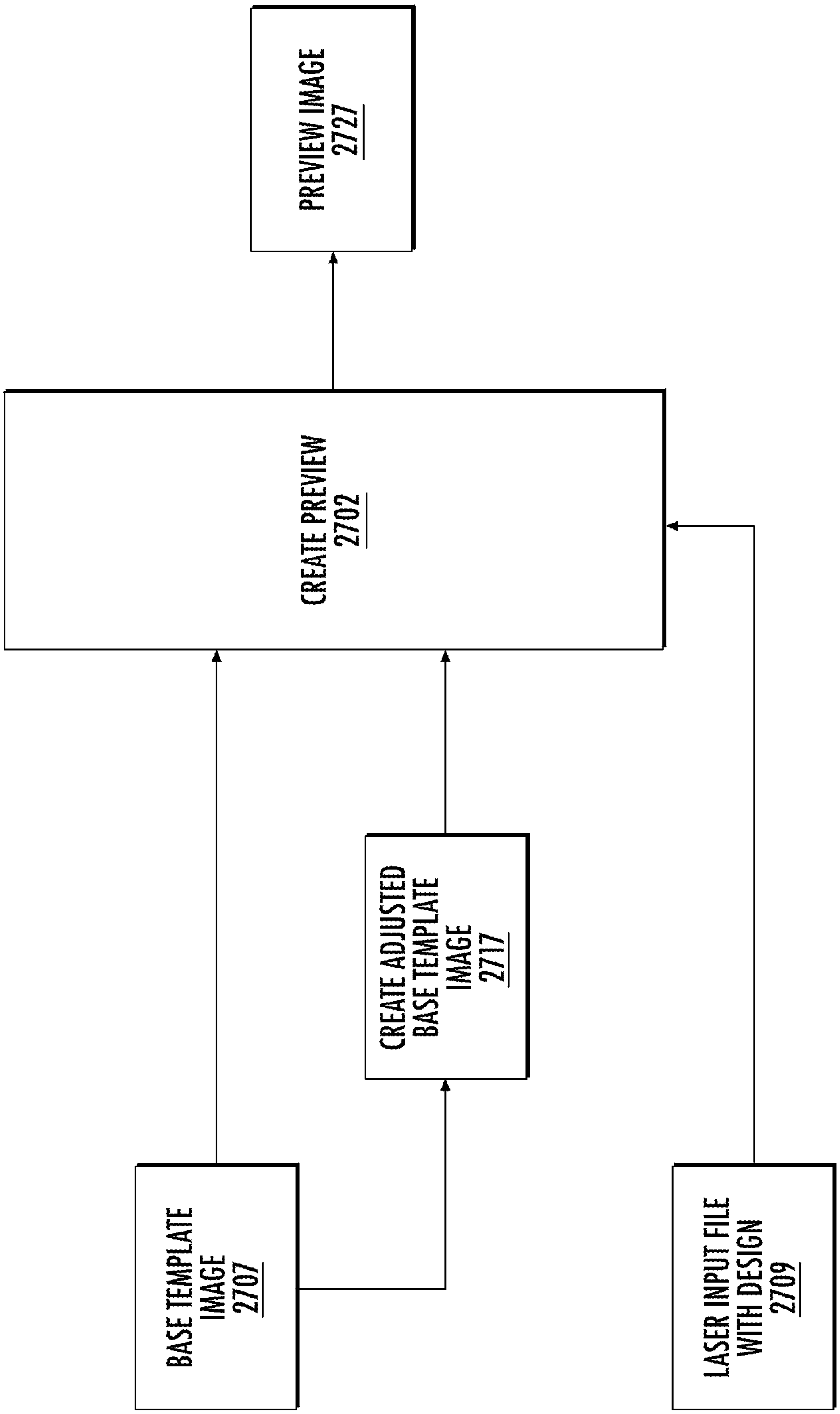
FIG. 27 shows a block diagram of a system of generating a preview of a laser-finishing pattern on a garment, such as jeans.

FIG. 27 shows a block diagram of a system of generating a preview of a laser-finishing pattern on a garment, such as jeans. Inputs to a create preview image process 2702 include a base template image 2707 and laser input file 2709. The base template image is used to create an adjusted base template image 2717, which is also input to the create preview image process. These create preview image process uses these three inputs to create a preview image 2727, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

For a specific implementation of a laser, a specification for the laser input file is that each pixel is represented by an 8-bit binary value, which represents grayscale value in a range from 0 to 255. A 0 black prints the highest intensity (i.e., creates the most change and will be the lightest possible pixel) and a 255 white does not print at all (i.e., creates the least change or will be the darkest possible pixel).

For a laser input file for this laser implementation, a reverse or negative image of the laser input file is input to the create preview image process. Based on the negative laser input file, to create each pixel in the preview image, the create preview image process will pass pixels of the base template image or the adjusted base template image, or a combination of these.

For the negative laser input file, a black pixel means the pixel (which was a white pixel in the original file) will not be lasered (which results in the original indigo color of the fabric). And a white pixel means the pixel (which was black in the original file) will be lasered at highest level (which results in the whitest color that can be achieved on the fabric). And for gray pixels between black and white, the result will be proportional to the value, somewhere between darkest and lightest colors.

Similarly, to create the preview image, based the negative laser input file, a pixel of a (1) base template image (e.g., unbleached) or (2) adjusted base template image (e.g., bleached) or (3) some mixture or combination of the base template image and adjusted base template image proportional to the grayscale value in the negative laser input file. For example, for a gray value in the negative laser input file, 60 percent of the base layer and 40 percent of the adjustment layer pass through to the preview image.

The above discussion described a laser input file conforming to one type of logic. However, in other implementations of a laser, the values in the laser input file can be the reverse or negative logic compared to that described above. As one of ordinary skill in the art would appreciate, the techniques described in this patent can be modified accordingly to work with negative or positive logic laser input files.

FIGS. 28-35E show an implementation of a three-dimensional (3-D or 3D) previewing feature of a laser finishing design tool, such as a digital brief tool (e.g., digital brief tool 1803 of FIG. 18). For example, after creating or selecting a product, the user can view the product (e.g., garment) in three dimensions or 3D. This 3D preview feature allows a user to see a 360-degree preview (in any direction or orientation) of a garment with a laser finishing pattern as the garment would appear when it is worn by a person.

The preview can be shown with a simulated light source, where a positioning of the simulated light source can be moved by the user. Or, the simulated light source can be at a particular position, and the user can move the garment above the simulated light source. The preview image will appear with the shadows based on the positioning of the light source.

Additionally, the preview image can be used in the digital brief tool or other tools where it is desirable for users to view previews of garments. Some examples include a consumer sales or ordering Web site (e.g., such as a preview available through a Web browser), where the three-dimensional preview allows the user to see the garment before making the order. Another example is a sales for wholesalers, distributors, retailers, and other buyers of a manufacturers product. The three-dimensional preview can provide the buyers a realistic view of the garments to be ordered, without needing to make physical samples or as many physical samples.

Figure 28:
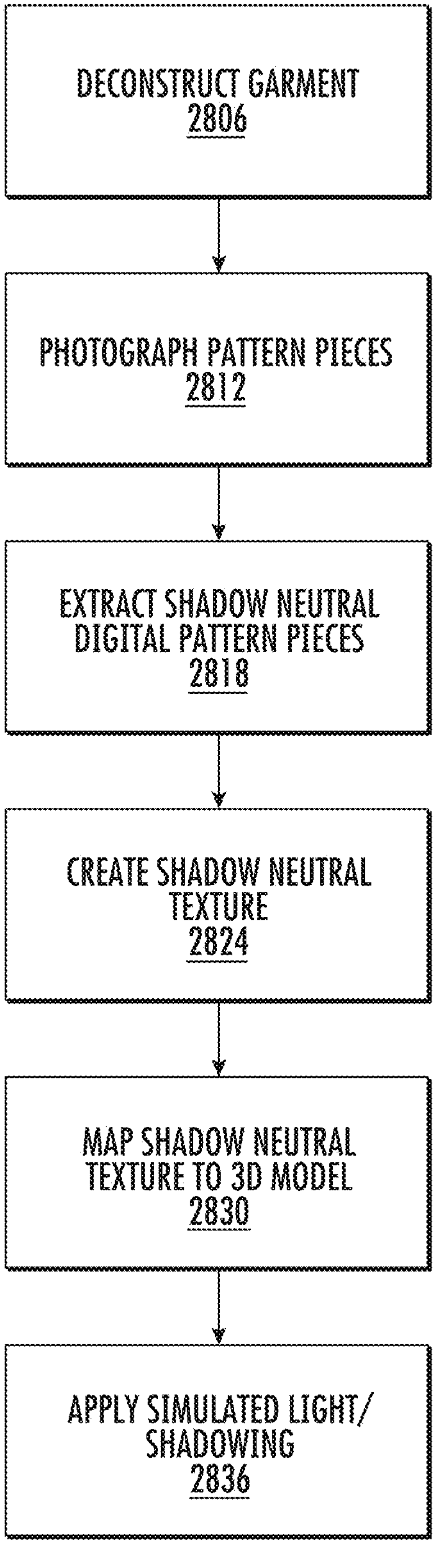
FIG. 28 shows an overall flow for creating a three-dimensional preview for an apparel product, such as a pair of jeans.
Figure 29C:
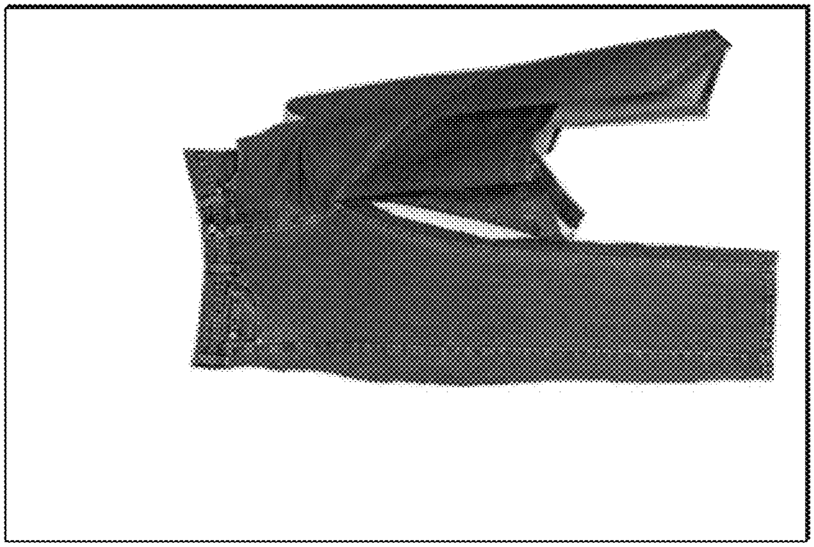
FIGS. 29A-29F show photographs of cutting a garment into pieces.
Figure 29B:
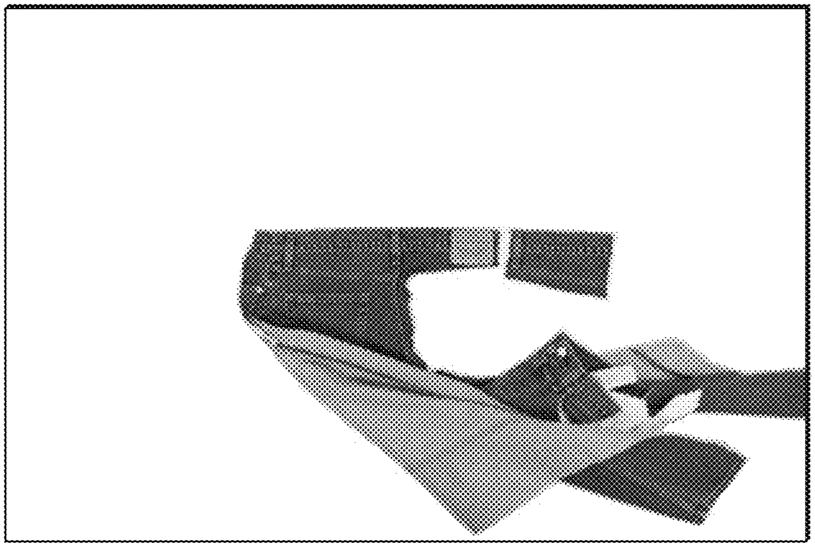
Figure 29A:
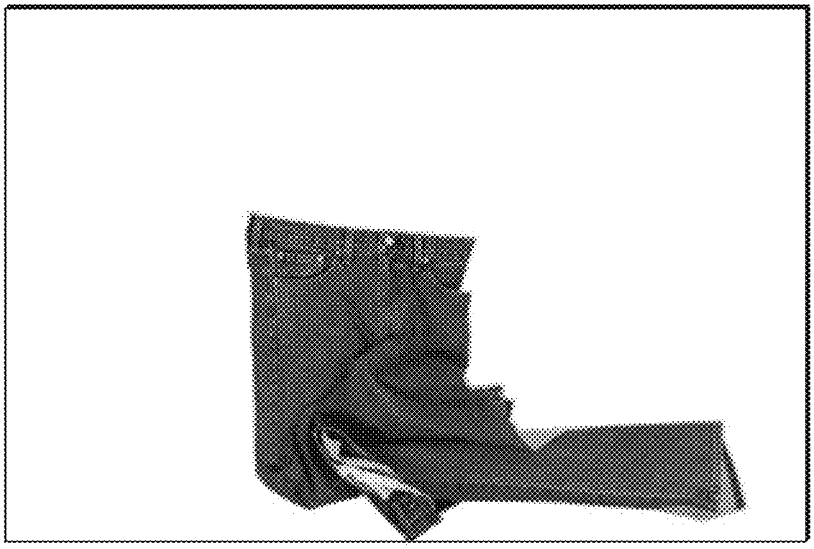
Figure 29F:
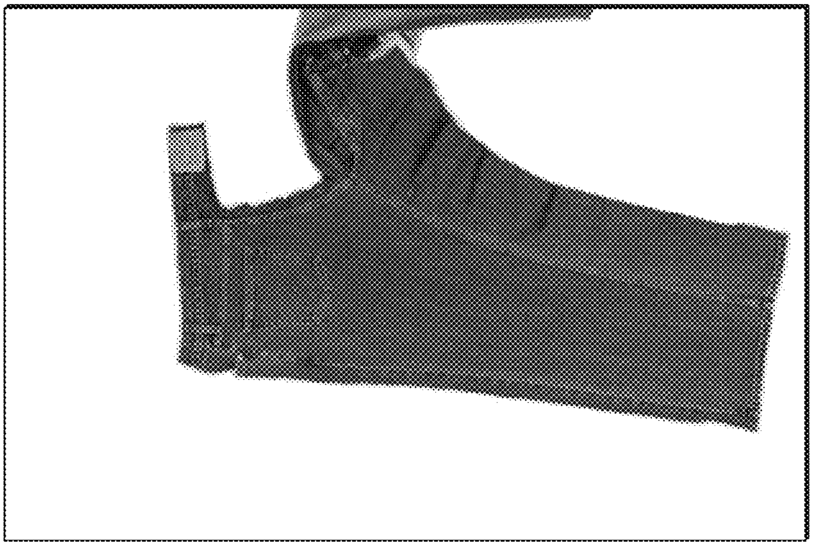
Figure 29E:
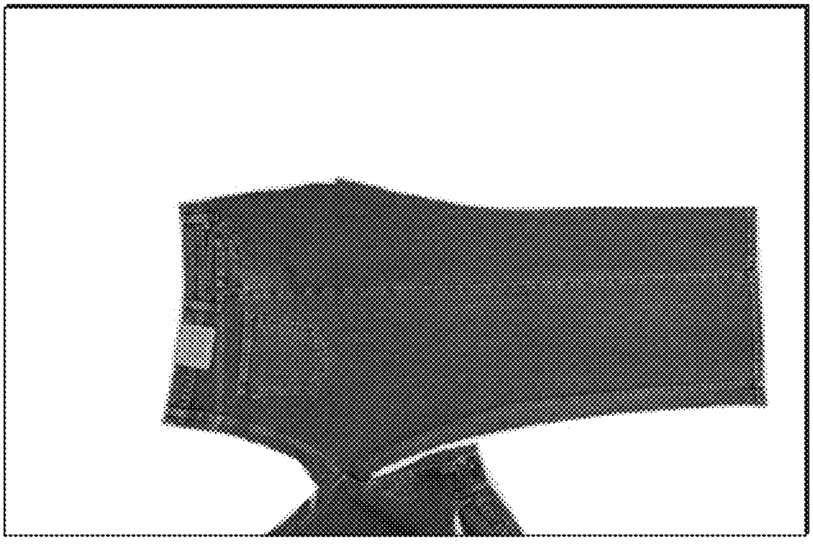
Figure 29D:
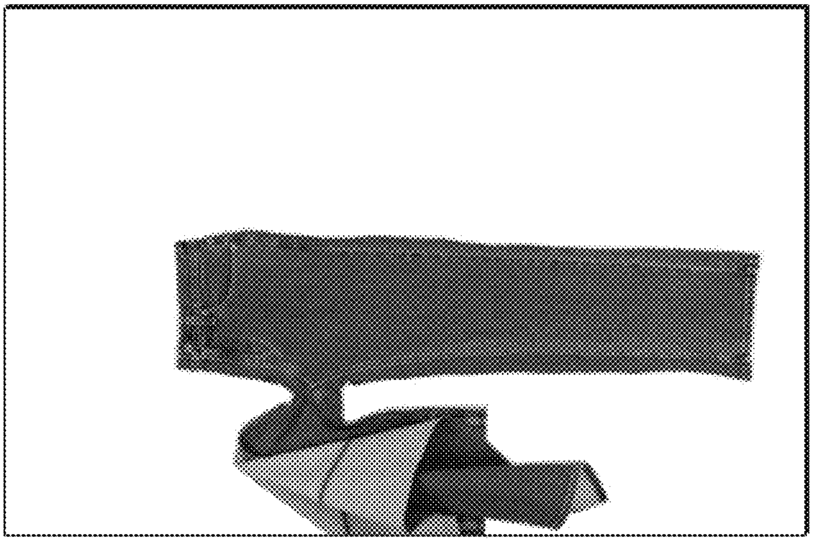

FIG. 28 shows an overall flow for creating a three-dimensional preview for an apparel product, such as a pair of jeans. The flow includes:

1. A deconstruct garment step 2806. A garment is cut into separate pieces so the pieces can be photographed flat. The shape of the cut pieces are specifically sized and selected for ensuring a high quality three-dimensional preview.
2. A photograph pattern pieces step 2812. The pieces of the garment are photographed while flat on a surface. Compared to photographing the pieces while sewed together, where sections of the garment may be
3. An extract shadow neutral digital pattern pieces 2818.
4. A create shadow neutral texture pieces 2824.
5. A map shadow neutral texture to three-dimensional (3-D or 3D) model step 2830.
6. An apply simulated light or shadowing, or both, step 2836.

The following describes a specific implementation of deconstruct garment 2806. FIGS. 29A-29F show photographs of cutting a garment into pieces. The photos are for a specific implementation where the garment is a pair or pants, and in particular, a pair of jeans. Not that the seams are not ripped or cut, but rather the cut pieces include the seams with thread. This ensures the three-dimensional preview will represent the seams properly. Also the cut pieces do not necessarily correspond to the pattern panels used to contrast the garment. The cut pieces are cut into shapes that are appropriate for photographing flat and use in generating the three-dimensional preview.

The following describes a specific implementation of photograph pattern pieces 2812. A photograph of each deconstructed pattern pieces is taken. Each photograph can be stored in a digital file, such as a JPEG, high efficiency video coding (HVEC), or other image file format.

Figure 30:
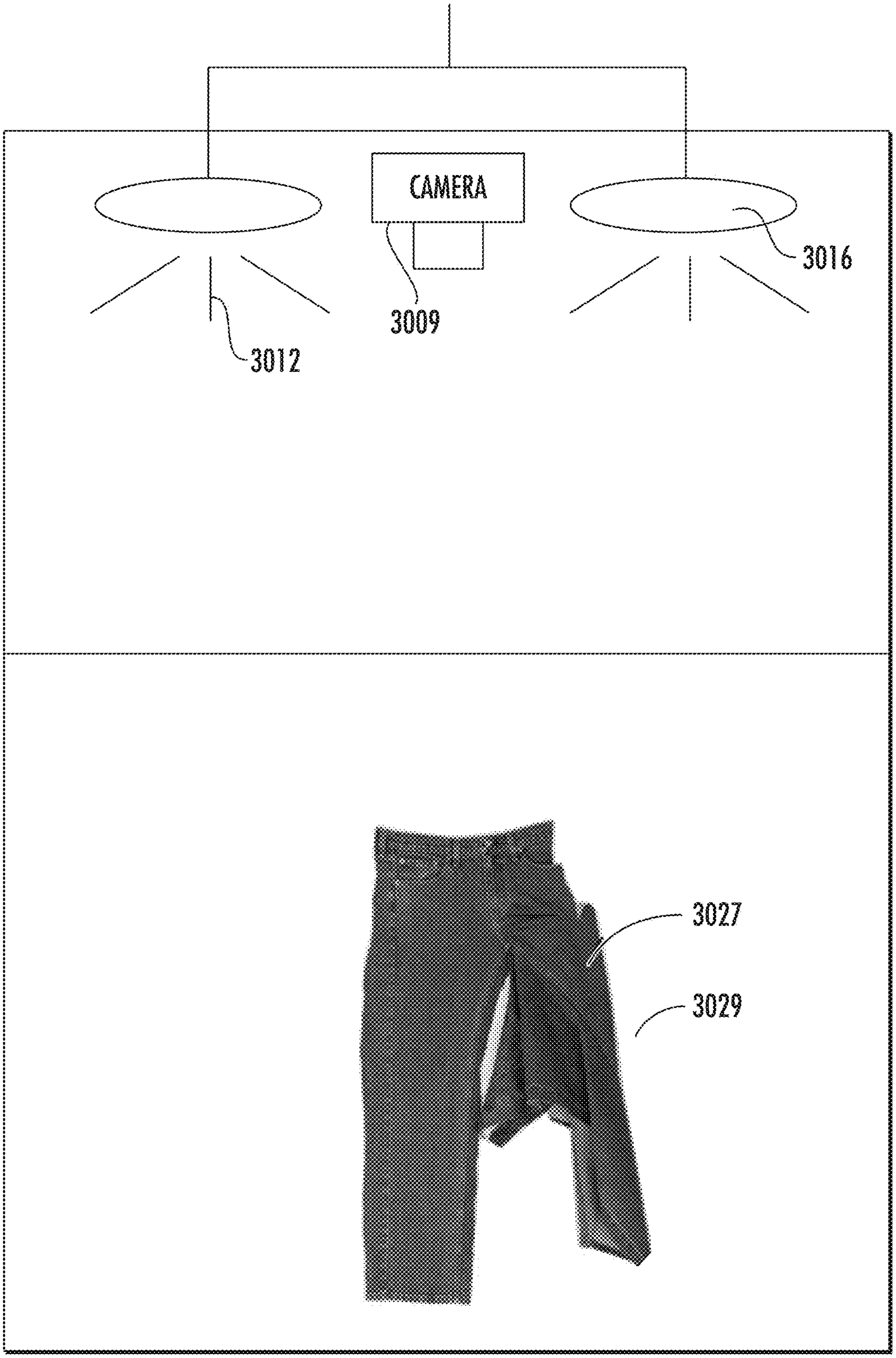
FIG. 30 shows a system for taking photographs of the garment pieces.

FIG. 30 shows a system for taking photographs of the garment pieces. The system includes a camera 3009 and lighting 3012 and 3016. Typically the camera and lights are mounted or positioned against or near a wall or ceiling of a room, or on one side of room. A garment or garment pieces 3027 that are to be photographed are laid flat on a surface, facing the camera and lighting. In an implementation, the camera and lightning are positioned above a table or other work surface 3029, horizontally orientated, upon which the garment is placed.

Alternatively, the camera and lightning are positioned on a side, and the work surface is vertically orientated on another side facing the camera and lightning. The garment pieces that be attached, such as using glue, pins, or hook and loop fasteners, to the vertical work surface.

The room can be a light room or light box. The room and work surface are typically painted or colored a white color. For good or best results, the white color used should be consistently the same shade throughout the room. Then any white balance adjustment or correction made at the camera or digitally after the photographs are taken will be more precise.

The lights of the lightning are positioned laterally (e.g., distributed evenly along the same plane as the work surface, which can be referred as an X direction) to evenly illuminate the work surface. So, the garment will be evenly illuminated without noticeably or significantly brighter or darker areas or portions. The lightning is also positioned a distance above the work surface (which can be referred as a Y direction) to allow for more even illumination.

The lens of the camera is positioned above (in the Y direction) the lighting source, so that the camera does not cast a shadow on the work surface or garment (e.g., horizontally orientated). And the camera can be positioned in the X direction so that lights are arranged uniformly about the camera lens. For example, in FIG. 30, camera 3009 is between lights 3012 and 3016. Also the camera lens should be positioned directly over the garment (in the X direction) being photographed. This ensures the photographs taken will not be at an angle.

A specific example of extract shadow neutral digital pattern pieces 2818 follows. After the photographs are taken, each photograph is processed to extract neutral digital pattern pieces. In the extraction process, the background and shadowing, if any, is removed.

Figure 31A:
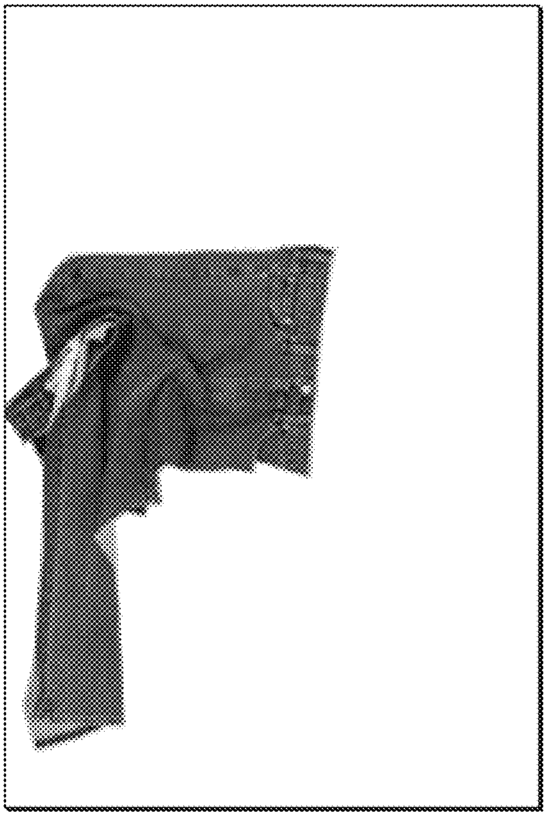
FIGS. 31A-31K show photographs of cut garment pieces and corresponding extracted neutral digital pattern pieces.
Figure 31B:
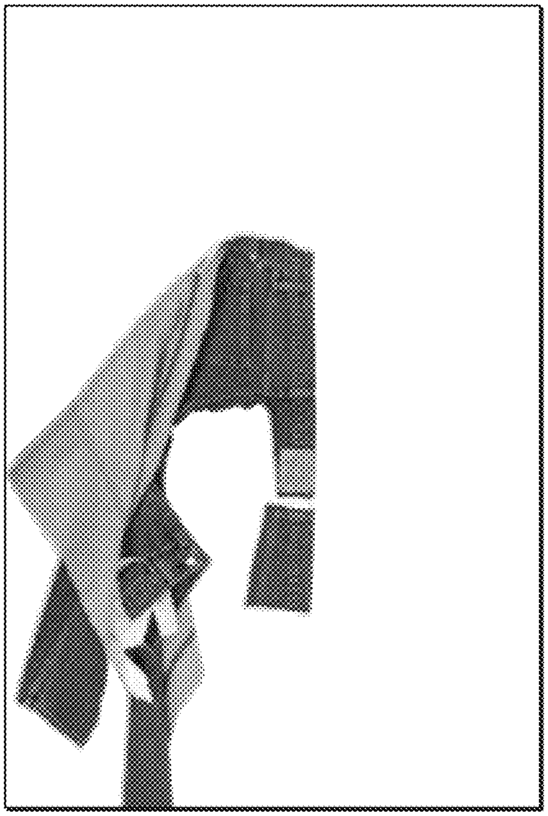
Figure 31C:
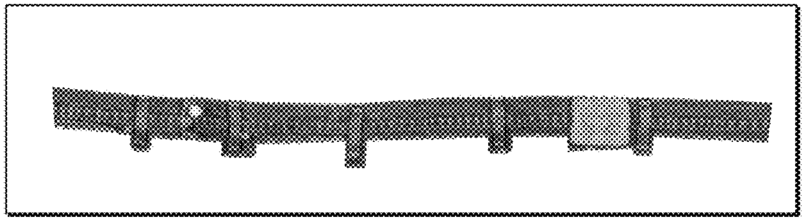

As examples, FIGS. 31A-31B show photographs of a waistband pieces on the work surface, and FIG. 31C shows the extracted neutral digital pattern piece for the waistband. The physical waistband may be cut into multiple pieces, and the photographs of the separate pieces can be digitally stitched together to create the complete extracted neutral digital waistband.

Figure 31D:
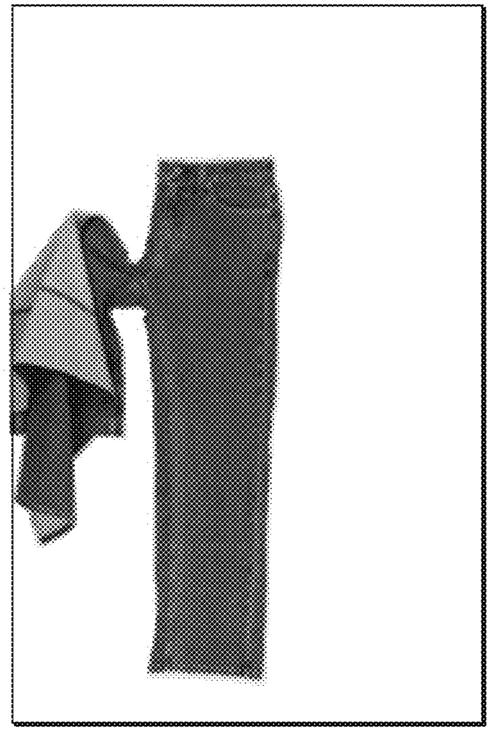
Figure 31F:
Figure 31E:
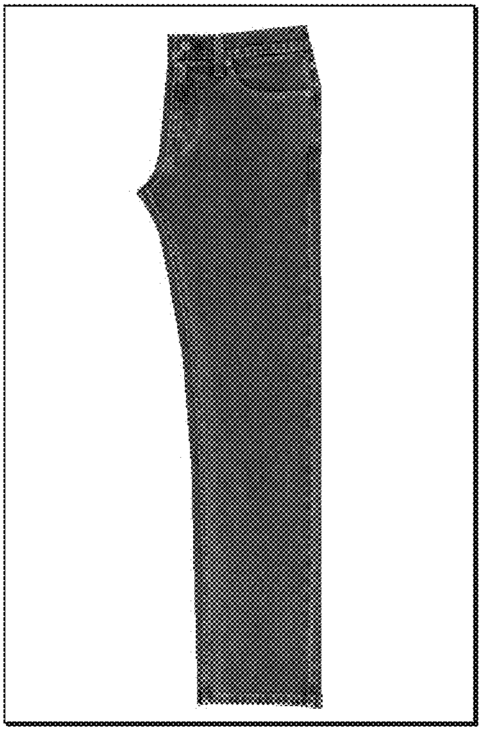
Figure 31G:
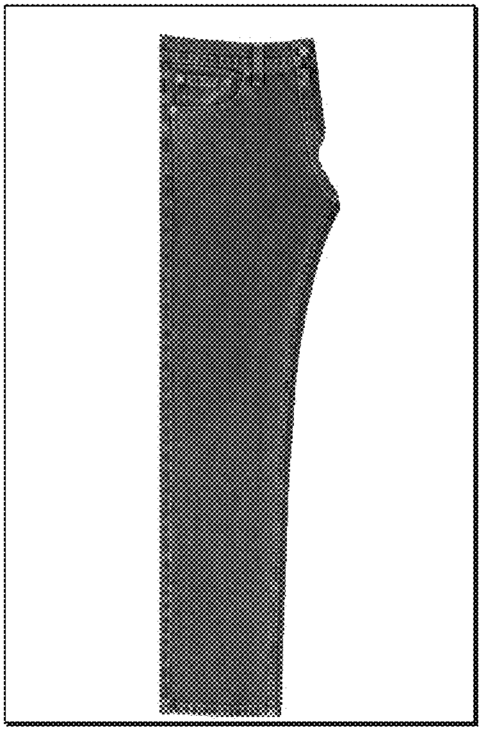

FIG. 31D shows a photograph of a left pant leg front of a pair of jeans with the background, and FIG. 31E shows the extracted neutral digital pattern piece for the left pant leg front. FIG. 31F shows a photograph of a right pant leg front of the jeans with the background, and FIG. 31G shows the extracted neutral digital pattern piece for the right pant leg front.

Figure 31H:
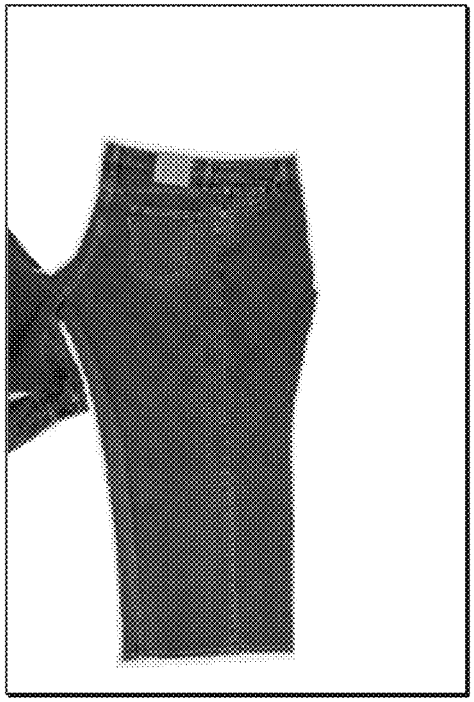
Figure 31J:
Figure 31I:
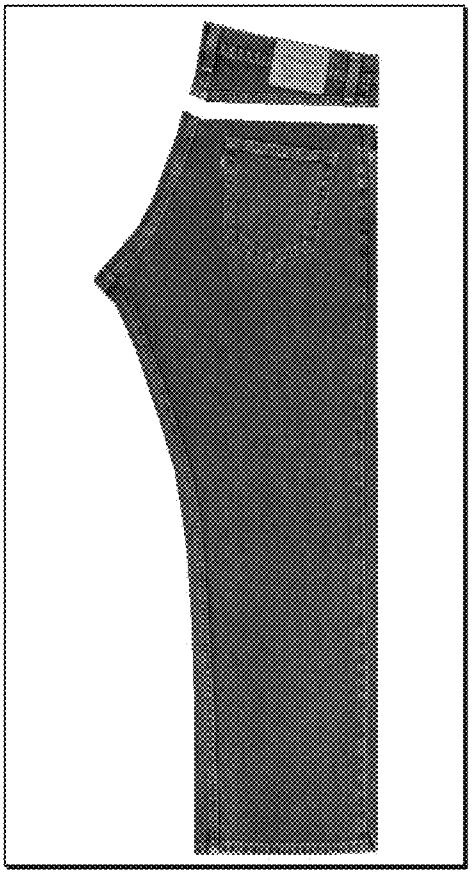
Figure 31K:
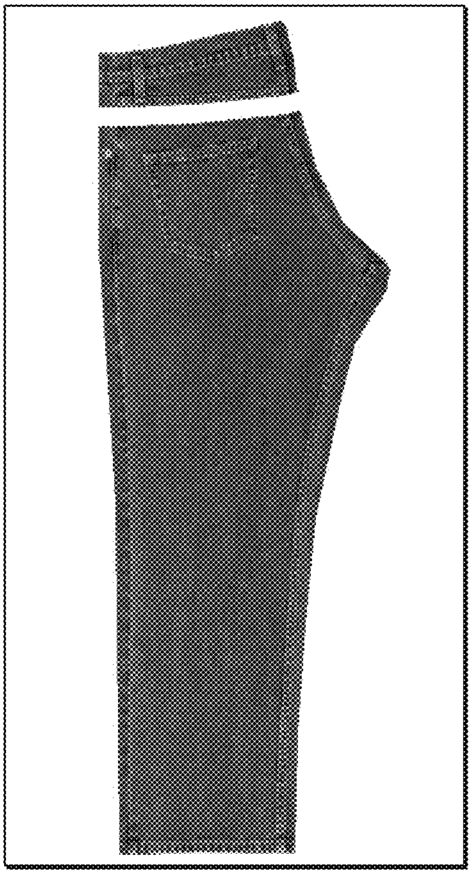

FIG. 31H shows a photograph of a right pant leg back or rear of the jeans with the background, and FIG. 31I shows the extracted neutral digital pattern piece for the right pant leg back. FIG. 31J shows a photograph of a left pant leg back or rear of the jeans with the background, and FIG. 31K shows the extracted neutral digital pattern piece for the left pant leg back.

The extracted pattern pieces are shadow neutral since the pattern pieces were photographed while flat. In contrast, for garments that are photographed or scanned while on a fit model or mannequin, the extracted pattern pieces would not be shadow neutral. The garment pieces based on curved surfaces, conforming to the shape of the fit model or mannequin. When the curved surfaces are flattened, there would be shadowing, such as wrinkles and other aberrations. So when those nonshadow neutral extracted pattern pieces are used with a three-dimensional model to generate a preview, the preview will have an appearance that does not look natural, such as having unusual shadowing.

Figure 32C:
FIGS. 32A-32C show extracted shadow neutral pattern pieces.
Figure 32B:
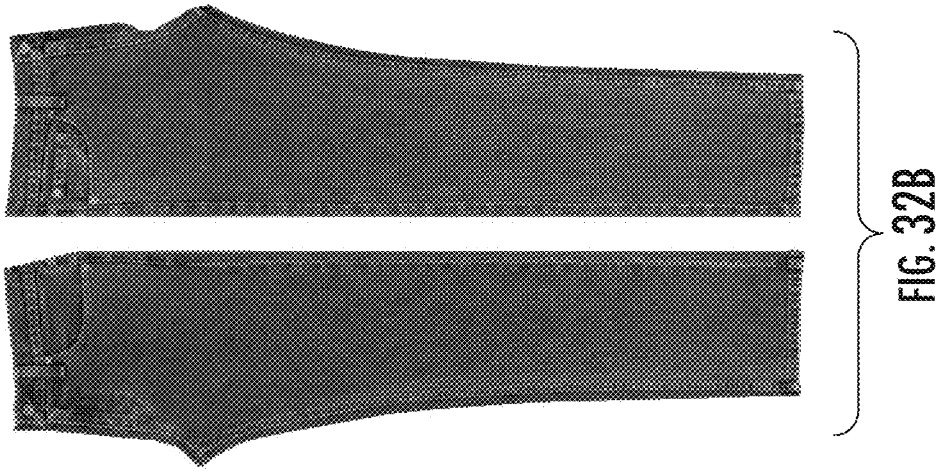
Figure 32A:
Figure 32D:
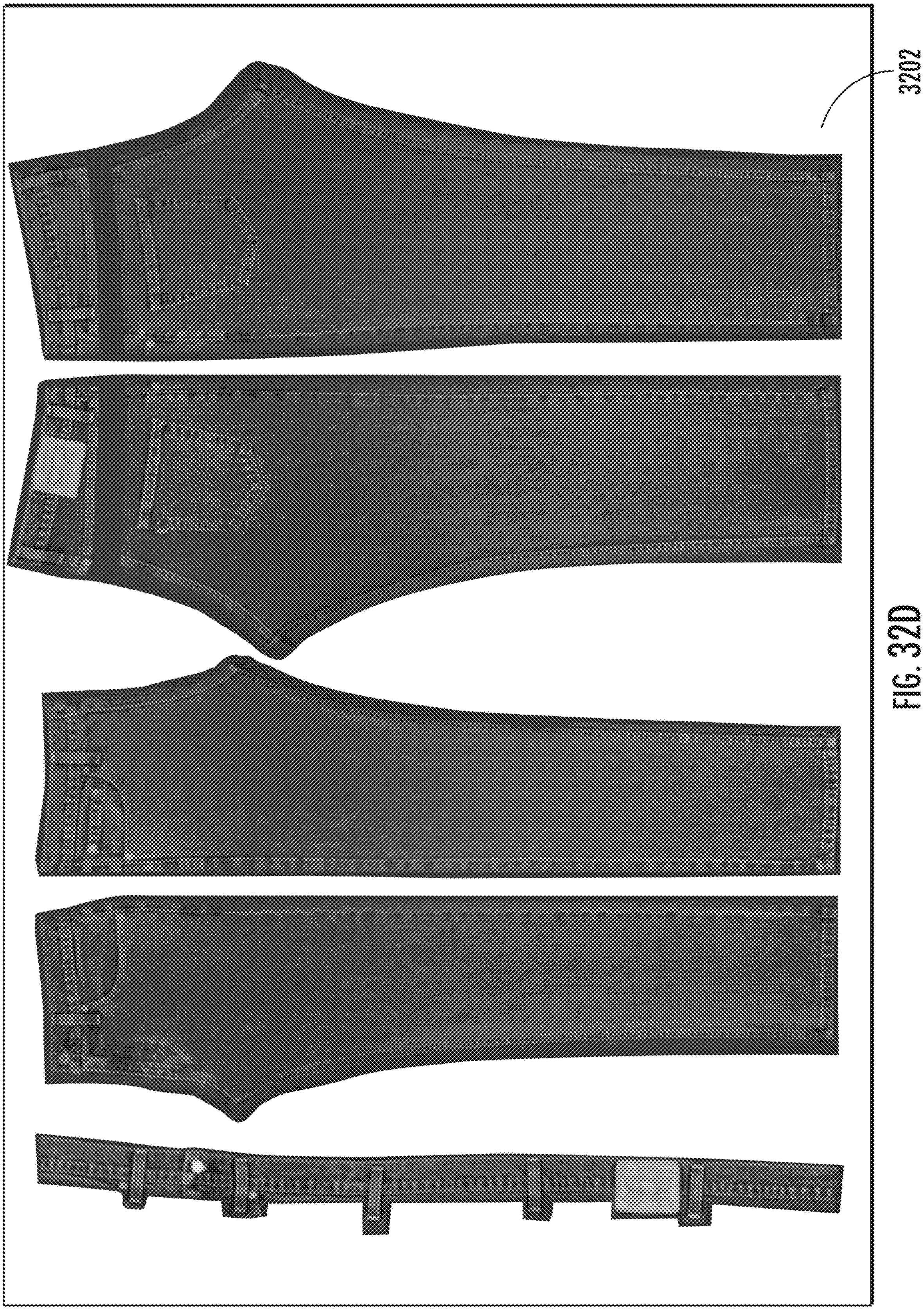
FIG. 32D shows a shadow neutral texture created using the extracted shadow neutral pattern pieces and a color layer.

A specific example of create shadow neutral texture pieces 2824 follows. FIG. 32A-32C show the extracted shadow neutral pattern pieces. FIG. 32D shows a shadow neutral texture created using the extracted shadow neutral pattern pieces and a color layer 3202.

To create the shadow neutral texture, the extracted shadow neutral pattern pieces are combined with a color layer, which typically is a color which is close to that of a color the garment. For example, for blue jeans, the color layer used will be a similar shade of blue or indigo as on the blue jeans.

The color layer of the shadow neutral texture allows stitching together of the different neutral pattern pieces, when mapped to a three-dimensional model, such any potential gaps between the pattern pieces will appear seamless. For example, if a very different color is used for the color layer, such as white, than the jeans color, then gaps that do not exactly align may show this color (e.g., white line).

A specific example of map shadow neutral texture to three-dimensional (3D) model 2830 follows. FIG. 33A shows a created shadow neutral texture 3307. FIG. 33B shows a front view of a three-dimensional model, which the shadow neutral texture will be applied or mapped to. FIG. 33C shows a result of mapping the shadow neutral texture to the three-dimensional model. This figure shows the front of the garment with the form and wrinkles (e.g., subtle draping, subtle pleating, and other surface contouring) resulting from the mapping to the three-dimensional model. The mapping will show the garment to have an appearance of when the garment is worn by a person. This image can be used as a three-dimensional preview image.

In an implementation, a digital design tool generates a three-dimensional photorealistic visualization garment with a selected finishing pattern). The garment will appear as though it is worn by a person, with simulated wrinkling or simulated shadowing, or both. The appearance of a worn garment is in contrast to a flat garment, such as when a garment is lying on a table or shelf (which is generally a two-dimensional image). Additionally, when the wear pattern (which is in the laser file as a two-dimensional image) is mapped onto the garment, the wear pattern is transformed, converted, or mapped (such as by using mathematical calculations) to have a three-dimensional appearance, similar to situation of how the garment pieces are mapped the three-dimensional model.

The digital design tool allows various and combinations of manipulations of the three-dimensional photorealistic visualization. For example, in an implementation, the user can reposition the light source as desired, which will change the appearance of the shadowing. For example, the light source can be from the front, back, left side, right side, above, below, or other positioning.

In an implementation, the user can change the rotation angle (or angular point of view) through which the garment is viewed. For example, the user can rotate the garment 360 degrees in the X direction (e.g., left and right). The user can rotate the garment 360 degrees in the Y direction (e.g., left and right). And the user can rotate the garment. And the user can rotate the garment in any angle in a combination of X and Y directions. At any angle of rotation, the garment can be zoomed in or zoomed out. When zoomed in, the user can see, for example, the fine details of the material or wear pattern. When zoomed out, the user can see, for example, the entire garment from various perspectives.

In an implementation, the user can change a positioning of the garment itself. For example, the user can reposition the garment to a left-hand side position. The user can reposition the garment to a right-hand side position. The user can reposition the garment to a further back position. The user can reposition the garment to a further forward position.

Figure 33D:
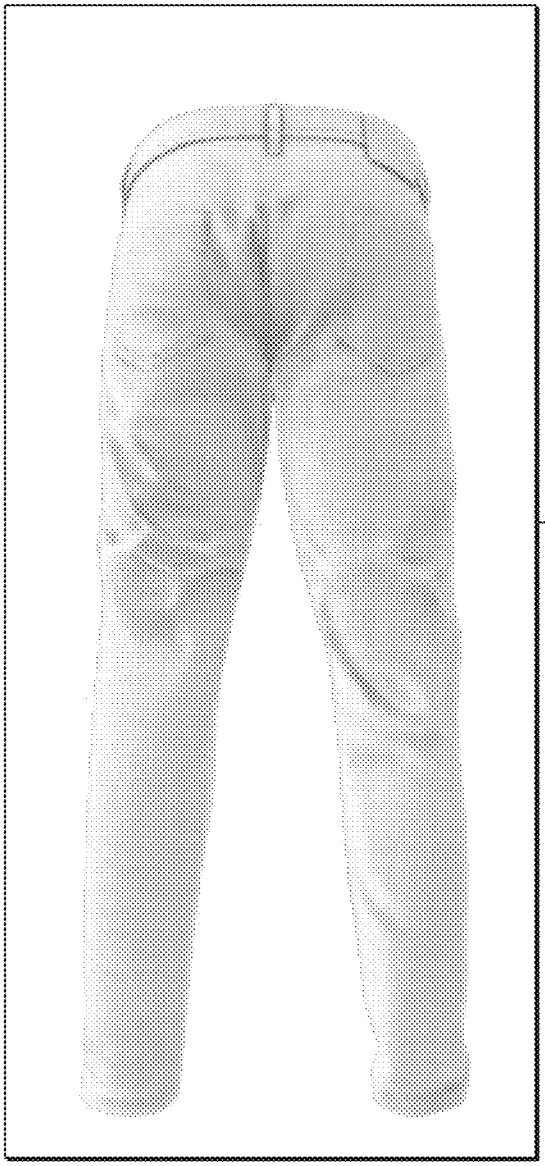
Figure 33E:
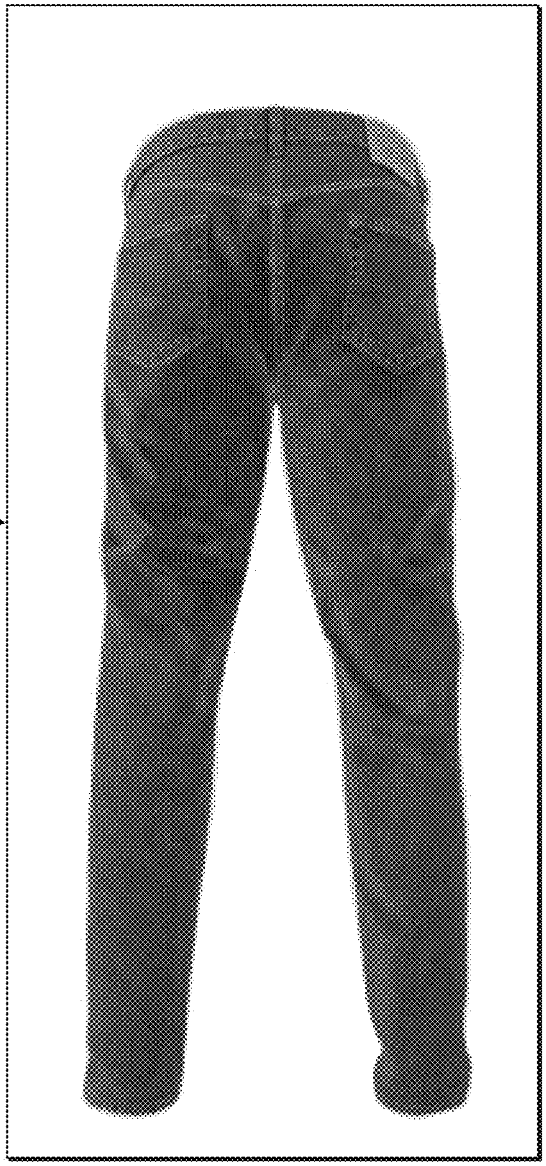
FIG. 33E shows a result of mapping the shadow neutral texture to the three-dimensional model.

Similarly, FIG. 33D shows a back or rear view of the three-dimensional model, which the shadow neutral texture will be applied or mapped to. FIG. 33E shows a result of mapping the shadow neutral texture to the three-dimensional model. This figure shows the back of the garment with the form and wrinkles resulting from the mapping to the three-dimensional model. This image can be used as a three-dimensional preview image.

There are various ways to generate a three-dimensional model. One technique is to generate a three-dimensional model from a scan of a physical three-dimensional object, such as a fit model or mannequin. Another technique to create a three-dimensional model from scratch using software. Such software can allow a designer to three-dimensional model analogous to using molding a clay sculpture. Another technique to create a three-dimensional model from software (e.g., computer aided design (CAD) or computer aided manufacturing (CAM) tool) where two-dimensional pattern pieces of a garment are converted into to three dimensions.

A specific example of apply simulated light or shadowing, or both, 2836 follows. A shadow neutral texture and three-dimensional model can be inputs to a rendering engine or software to render the preview image. Some examples of rendering engines include Google's ARCore, WebGL, and others. U.S. patent application 62/877,830, filed Jul. 23, 2019, describes further details of three-dimensional rendering of laser-finished garments and is incorporated by reference.

With the rendering engine, an object such as the garment can be rendered or previewed with shadowing generated by the engine or software. The shadows will change based on a relative positioning of a simulated light source and object. Further, the rendering engine can change a camera position of point of view (POV) of the user, so that the preview will have the shadowing from that camera position.

In a specific implementation, a rendering engine maps the shadow neutral texture to the three-dimensional model, or preview image, and generates the preview image with shadowing based on a positioning of a simulated light source. The positioning of the light source can be changed or varied.

Figure 34A:
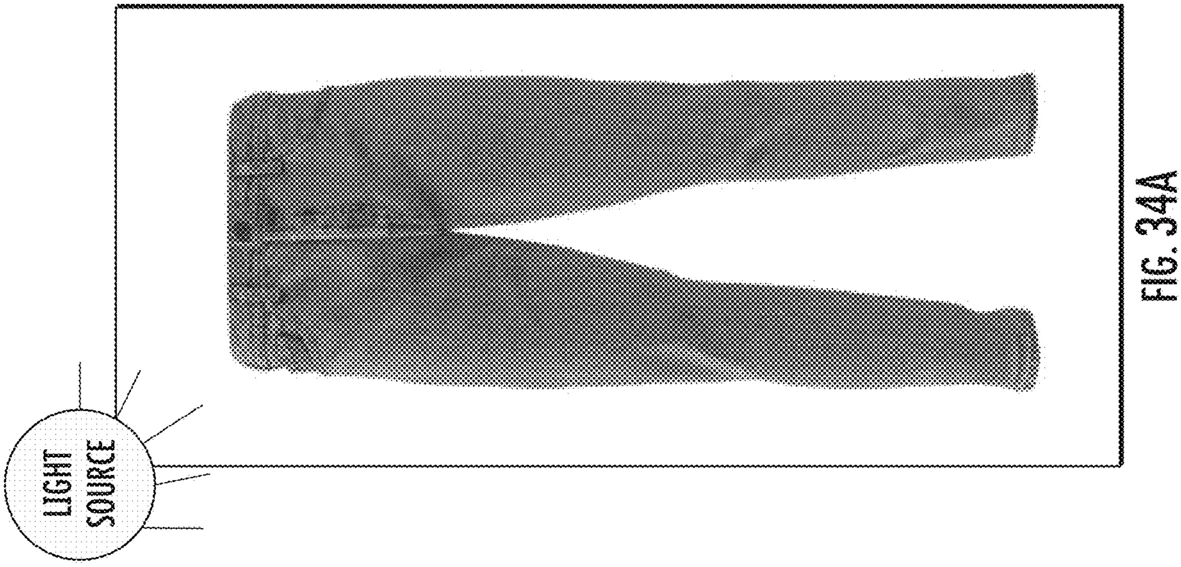
FIG. 34A shows an example of a simulated light source positioned to a right of and above the garment.
Figure 34B:
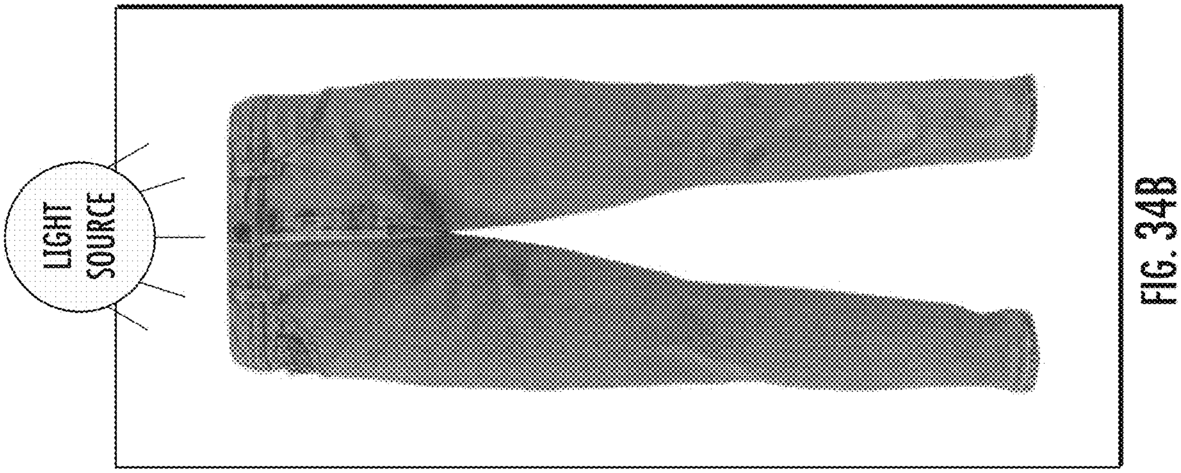
FIG. 34B shows an example of a simulated light source positioned directly above the garment.
Figure 34C:
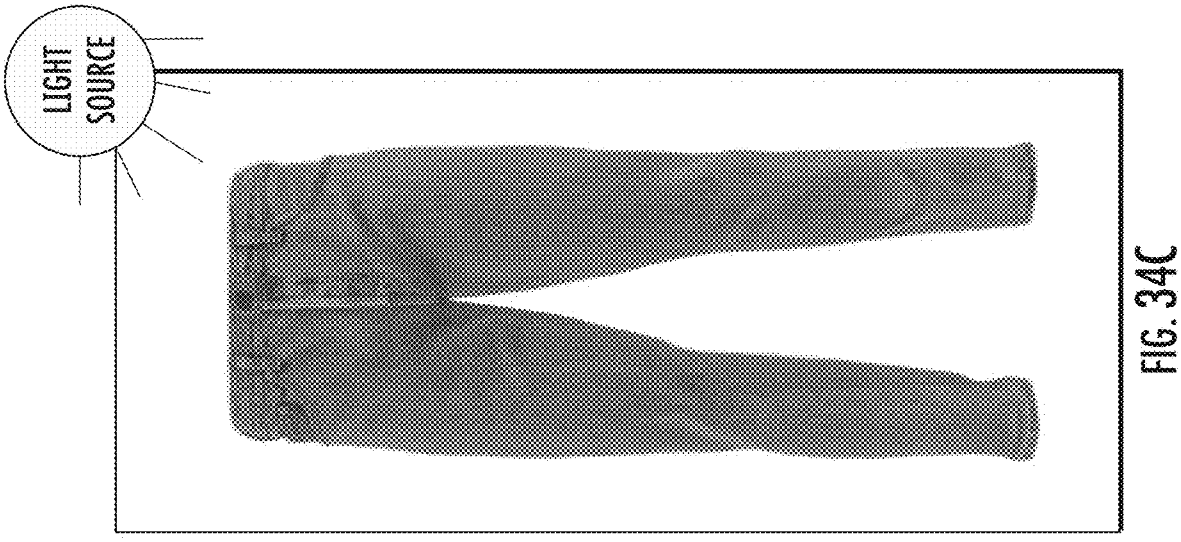
FIG. 34C shows an example of a simulated light source positioned to a left of and above the garment.

For example, FIG. 34A shows an example of a simulated light source positioned to a right of and above the garment. FIG. 34B shows an example of a simulated light source positioned directly above (e.g., centered) the garment. FIG. 34C shows an example of a simulated light source positioned to a left of and above the garment. The shadowing, wrinkles, and contours are shown in the preview image in accordance with positioning the simulated light source. The shadows are generated by the rendering software. This is in contrast to shadows that are present garment when the photographs or scans are taken, when a shadow neutral texture creation approach is not user.

Alternatively, the user can rotate or change the positioning of the garment, and the shadowing, wrinkles, and contours will be shown in accordance with the changed positioning. This is due to the change in the relative positioning between the garment and the light source. The shadows are generated by the rendering software.

Figure 35A:
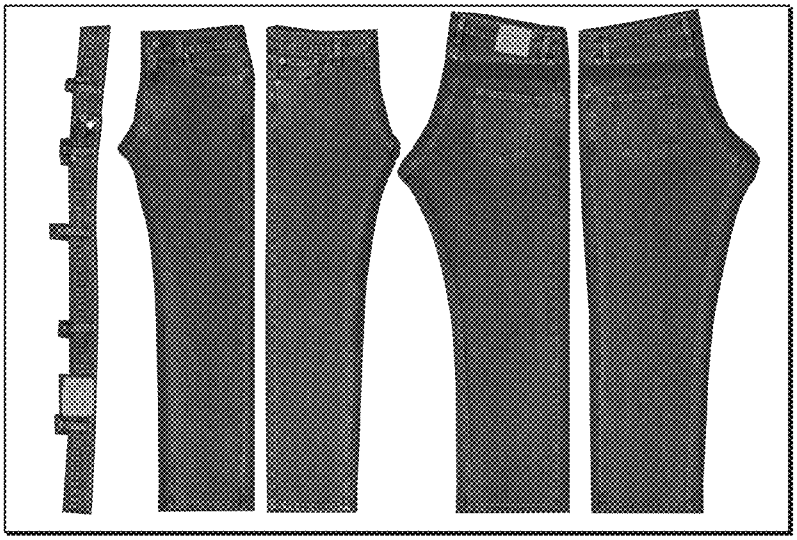
FIGS. 35A-35E show how a single three-dimensional model can be used with multiple shadow neutral texture to generate a multiple preview images.
Figure 35B:
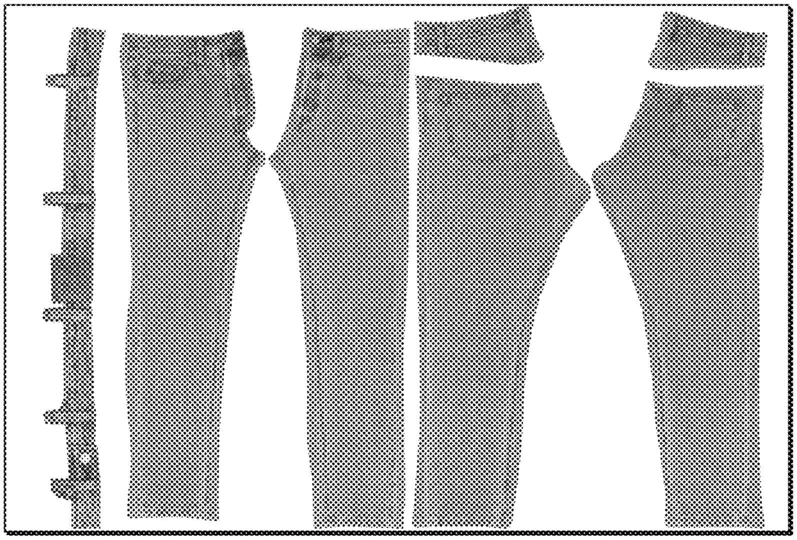
Figure 35C:
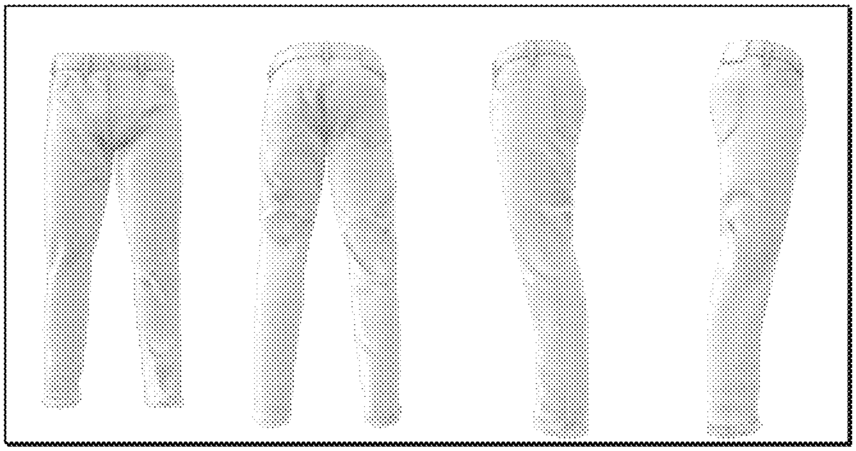

FIG. 35A shows an example of a first shadow neutral texture, which is a pair of jeans having a finish of a first shade. FIG. 35B shows an example of a second shadow neutral texture, which is a pair of jeans having a finish of a second shade. The second shade is different and lighter than the first shade. FIG. 35C shows various view of a three-dimensional model. There are front, back, left side, and right side views.

Figure 35D:
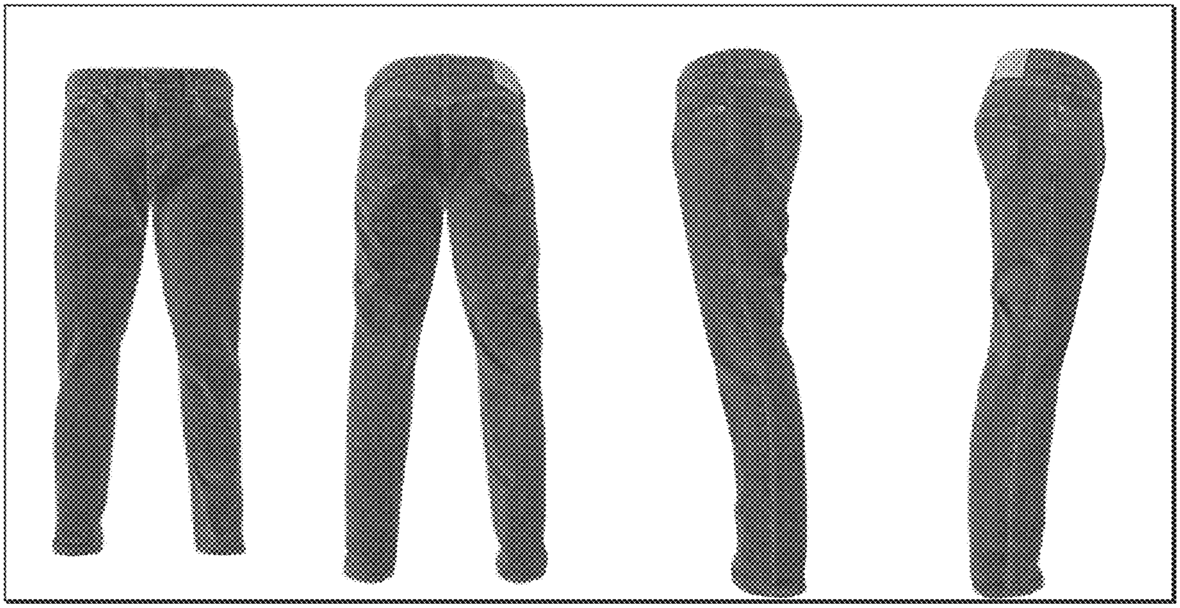
Figure 35E:
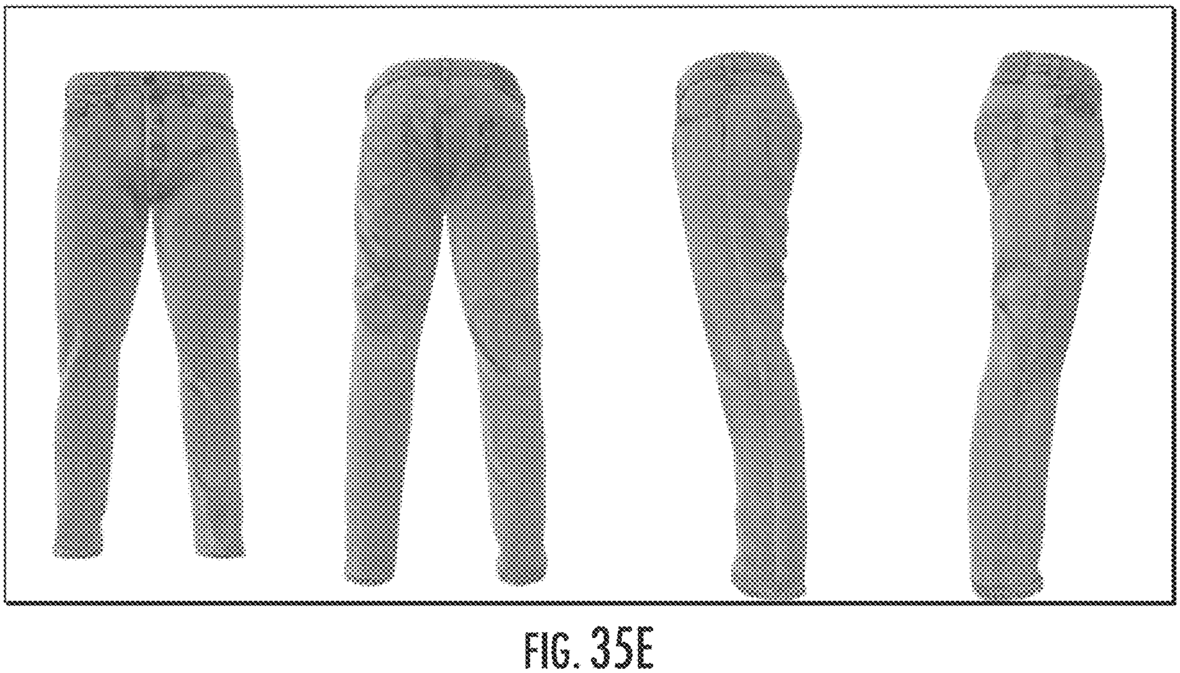

FIG. 35D shows of the first shadow neutral texture mapped to the three-dimensional model to generate a corresponding preview image. The figure shows various view of the preview image. FIG. 35E shows of the second shadow neutral texture mapped to the three-dimensional model to generate a corresponding preview image. The figure shows various view of the preview image.

FIGS. 35A-35E show how a single three-dimensional model can be used with multiple shadow neutral texture to generate a multiple preview images. This allows one three-dimensional model to be used with multiple shadow neutral textures to more easily and rapidly generate preview images with different finishes.

Furthermore, there can be multiple three-dimensional models, such as a first three-dimensional model and a second three-dimensional model. The different three-dimensional models may represent different fits or styles. Then a single shadow neutral texture can be mapped to the first three-dimensional model to generate a corresponding preview image. And the single shadow neutral texture can be mapped to the second three-dimensional model to generate a corresponding preview image.

This allows generating multiple previews from a single shadow neutral texture. For example, a first preview may be for a first fit or style in the finish of the shadow neutral texture. And a second preview may be for a second fit or style in the same finish. This technique allows for more a single shadow neutral texture to be used to more easily and rapidly generate preview images of different models, where models can represent different fits (e.g., Levi's 501, 502, 504, 505, 511, 512, 514, 541, 311, 710, or 711) or styles (e.g., skinny, boot cut, wide leg, straight, relaxed, super skinny, slim, tapered, athletic, boyfriend, wedgie, and others).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

generating a three-dimensional preview image on a computer screen of a garment with a finishing pattern created using an input file, wherein the preview image is a preview image of the garment, simulated to have an appearance when the garment is worn by a person, and a user can select an angle from which to view the garment, and the generating comprises providing a base image of the garment without the finishing pattern, generating an adjusted base image from the base image of the garment without the finishing pattern, generating a pattern mask based on the input file, for a pixel at a pixel location of the preview image, obtaining a first contribution for the pixel location of the preview image by combining a first value for a pixel corresponding to the pixel location for the pattern mask and a pixel corresponding to the pixel location for the base image, for the pixel at the pixel location of the preview image, obtaining a second contribution at the pixel location for the preview image by combining a second value for the pixel corresponding to the pixel location for the pattern mask and a pixel corresponding to the pixel location for the adjusted base image, combining the first contribution and second contribution to obtain a color value for a pixel at the pixel location for the preview image, and displaying the generated preview image on the computer screen comprising the color value for the pixel at the pixel location.

2. The method of claim 1 wherein the generating a pattern mask based on the input file comprises:

generating an inverse image of the input file.

3. The method of claim 1 wherein the first contribution comprises a first percentage of the base image that passes to the preview image, and the second contribution comprises a second percentage of the base image that passes to the preview image.

4. The method of claim 1 wherein for the first contribution, the combining comprises a multiply operation of the first value for the pixel corresponding to the pixel location for the pattern mask and the pixel corresponding to the pixel location for the base image.

5. The method of claim 4 wherein for the second contribution, the combining comprises a multiply operation of the second value for the pixel corresponding to the pixel location for the pattern mask and the pixel corresponding to the pixel location for the adjusted base image.

6. The method of claim 1 comprising:
based on the generated preview image, using a machine to create a finishing pattern on an outer surface of the garment that is represented by the preview image.

7. The method of claim 6 wherein a finishing pattern in the generated preview image can extend across portions of the garment where two or more fabric panels are joined together by thread by exposing these portions to the machine.

8. The method of claim 6 wherein for portions of the garment exposed to the machine where the fabric panels are joined, the fabric panels are joined together using a thread comprising cotton.

9. The method of claim 1 wherein the garment comprises at least one of a denim garment, pair of pants, or pair of jeans.

10. The method of claim 1 wherein the garment is made of at least one of a twill material or a cotton twill material.

11. The method of claim 1 comprising:
providing a solid color tint image, wherein the combining the first contribution and second contribution to obtain a color value for a pixel at the pixel location for the preview image comprises
additionally combining with the first and second contributions, the solid color tint image, modified by an opacity parameter, to obtain the color value for the pixel at the pixel location for the preview image.

12. The method of claim 11 wherein the solid color tint image comprises at least one of a yellow color, red color, brown color, black color, green color, purple color, or pink color.

13. The method of claim 1 wherein the generating the adjusted base image from the base image of the garment without the finishing pattern comprises:
adjusting a hue parameter of the base image;
adjusting a saturation parameter of the base image;
adjusting a lightness parameter of the base image; and
using the base image with adjusted hue, adjusted saturation, and adjusted lightness as the adjusted base image.

14. The method of claim 1 wherein the user selects the angle from which to view the garment using a user input interface.

15. A method comprising:
providing a three-dimensional garment previewing tool that allows previewing on a computer screen of a jeans garment as customized by a user with a finishing pattern that will be created by using an input file, wherein a preview image of the garment previewing tool shows the jeans garment with the finishing pattern, and the user can select an angle in three dimensions from which to view the jeans garment, and
the garment previewing tool comprises
providing an option for the user to select a jeans garment base and upon the user's selection, showing a first garment preview image in three dimensions on the computer screen comprising a jeans base image for the selected garment base,
providing an option for the user to select a wear pattern, wherein the wear pattern is associated with an input file for that wear pattern to be used to produce that wear pattern onto a jeans garment,
after the wear pattern is selected, showing a second garment preview image in three dimensions on the computer screen comprising the selected wear pattern in combination with the jeans base image, wherein the second garment preview image replaces the first garment preview image,
wherein the second garment preview image is generated by a method comprising
generating an adjusted base image from the jeans base image without the selected wear pattern,
generating a pattern mask based on the input file associated with the selected wear pattern,
for a pixel at a pixel location of the second garment preview image, obtaining a first contribution for the pixel location of the second garment preview image by combining a first value for a pixel corresponding to the pixel location for the pattern mask and a pixel corresponding to the pixel location for the jeans base image,
for the pixel at the pixel location of the second garment preview image, obtaining a second contribution at the pixel location for the second garment preview image by combining a second value for the pixel corresponding to the pixel location for the pattern mask and a pixel corresponding to the pixel location for the adjusted base image,
combining the first contribution and second contribution to obtain a color value for a pixel at the pixel location for the second garment preview image, and
displaying the color value for the pixel at the pixel location in the second garment preview image.

16. The method of claim 15 comprising:
in the second garment preview image, allowing the user to select the wear pattern and modify a sizing of the wear pattern relative to the jeans base image, wherein as the user makes changes, the modified sizing of the wear pattern is displayed to the user in real time, and
showing a third garment preview image on the computer screen comprising the jeans base image and selected wear pattern with modified sizing.

17. The method of claim 15 comprising:
in the second garment preview image, allowing the user to select the wear pattern and modify a position of the wear pattern relative to the jeans base image, wherein as the user makes changes, the modified positioning of the wear pattern is displayed to the user in real time, and
showing a third garment preview image on the computer screen comprising the jeans base image and selected wear pattern with modified positioning.

18. The method of claim 15 comprising:
providing a target pair of jeans corresponding to the jeans garment base selected by the user; and
based on the input file associated with the second garment preview image comprising the selected wear pattern, using a machine to create a finishing pattern on an outer surface of the target jeans.

19. The method of claim 15 wherein the user selects the wear pattern by way of a user input interface.

20. The method of claim 15 wherein the user selects the angle from which to view the jeans garment is by way of a user input interface.

* * * * *